(12) United States Patent
Okuyama et al.

(10) Patent No.: US 7,137,704 B2
(45) Date of Patent: Nov. 21, 2006

(54) COLOR SPLITTING/COMBINING OPTICAL SYSTEM AND IMAGE PROJECTING APPARATUS

(75) Inventors: Atsushi Okuyama, Saitama (JP); Masayuki Abe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/807,814

(22) Filed: Mar. 23, 2004

(65) Prior Publication Data

US 2004/0189948 A1    Sep. 30, 2004

(30) Foreign Application Priority Data

Mar. 25, 2003    (JP)    ............... 2003-082811

(51) Int. Cl.
*G03B 21/14* (2006.01)
*G02F 1/13363* (2006.01)

(52) U.S. Cl. ................ 353/20; 353/33; 359/496; 349/57

(58) Field of Classification Search ............ 353/33, 353/31, 20, 84; 349/7–10, 18, 57; 348/750, 348/756, 757
See application file for complete search history.

(56) References Cited

U.S. PATENT DOCUMENTS

| | | | |
|---|---|---|---|
| 5,658,490 A | 8/1997 | Sharp et al. | |
| 5,751,384 A | 5/1998 | Sharp | |
| 5,822,021 A | 10/1998 | Johnson et al. | |
| 5,825,849 A | 10/1998 | Garland et al. | |
| 5,929,946 A | 7/1999 | Sharp et al. | |
| 5,953,083 A | 9/1999 | Sharp | |
| 5,990,996 A | 11/1999 | Sharp | |
| 5,999,240 A | 12/1999 | Sharp et al. | |
| 6,046,786 A | 4/2000 | Sharp et al. | |
| 6,049,367 A | 4/2000 | Sharp et al. | |
| 6,078,374 A | 6/2000 | Sharp et al. | |
| 6,327,093 B1 * | 12/2001 | Nakanishi et al. | .......... 359/634 |
| 6,347,014 B1 * | 2/2002 | Hayashi et al. | ............. 359/634 |
| 6,375,330 B1 * | 4/2002 | Mihalakis | .................... 353/31 |
| 6,626,540 B1 * | 9/2003 | Ouchi et al. | ................... 353/31 |
| 6,747,709 B1 * | 6/2004 | Kwon et al. | ................... 349/9 |
| 2002/0080287 A1 | 6/2002 | Yi et al. | |
| 2002/0140905 A1 | 10/2002 | Ouchi et al. | |
| 2003/0067586 A1 | 4/2003 | Chigira et al. | |
| 2004/0156022 A1 * | 8/2004 | Okuyama et al. | ............. 353/31 |
| 2005/0062936 A1 * | 3/2005 | Okuyama et al. | ............. 353/20 |

FOREIGN PATENT DOCUMENTS

| | | |
|---|---|---|
| CN | 1661419 | 8/2005 |
| EP | 1289312 A2 | 3/2003 |
| JP | 2001-154152 A | 6/2001 |
| JP | 2001-154268 | 6/2001 |
| JP | 2001-154294 A | 6/2001 |

(Continued)

*Primary Examiner*—W. B. Perkey
*Assistant Examiner*—Andrew Sever
(74) *Attorney, Agent, or Firm*—Morgan & Finnegan, LLP

(57) ABSTRACT

A color splitting/combining optical system includes a first optical member for color splitting and a second optical member which has a polarization splitting surface for color splitting/combining, a third optical member for color combining a first color-selective wave plates and a second color-selective wave plate. The first and second color-selective wave plates convert the polarization direction of light in a first and second wavelength regions respectively by 90 degrees. The optical system satisfies $\lambda 1 \neq \lambda 2$, where $\lambda 1$ and $\lambda 2$ represent wavelengths in which the ratio of the light component having the polarization direction converted by 90 degrees by the first and second color-selective wave plates respectively become substantially 50%.

11 Claims, 37 Drawing Sheets

FOREIGN PATENT DOCUMENTS

| | | |
|---|---|---|
| JP | 2002-207189 A | 7/2002 |
| JP | 2002-268138 A | 9/2002 |
| JP | 2002-277850 A | 9/2002 |
| JP | 2002-357708 A | 12/2002 |
| JP | 2003-75778 A | 3/2003 |

* cited by examiner

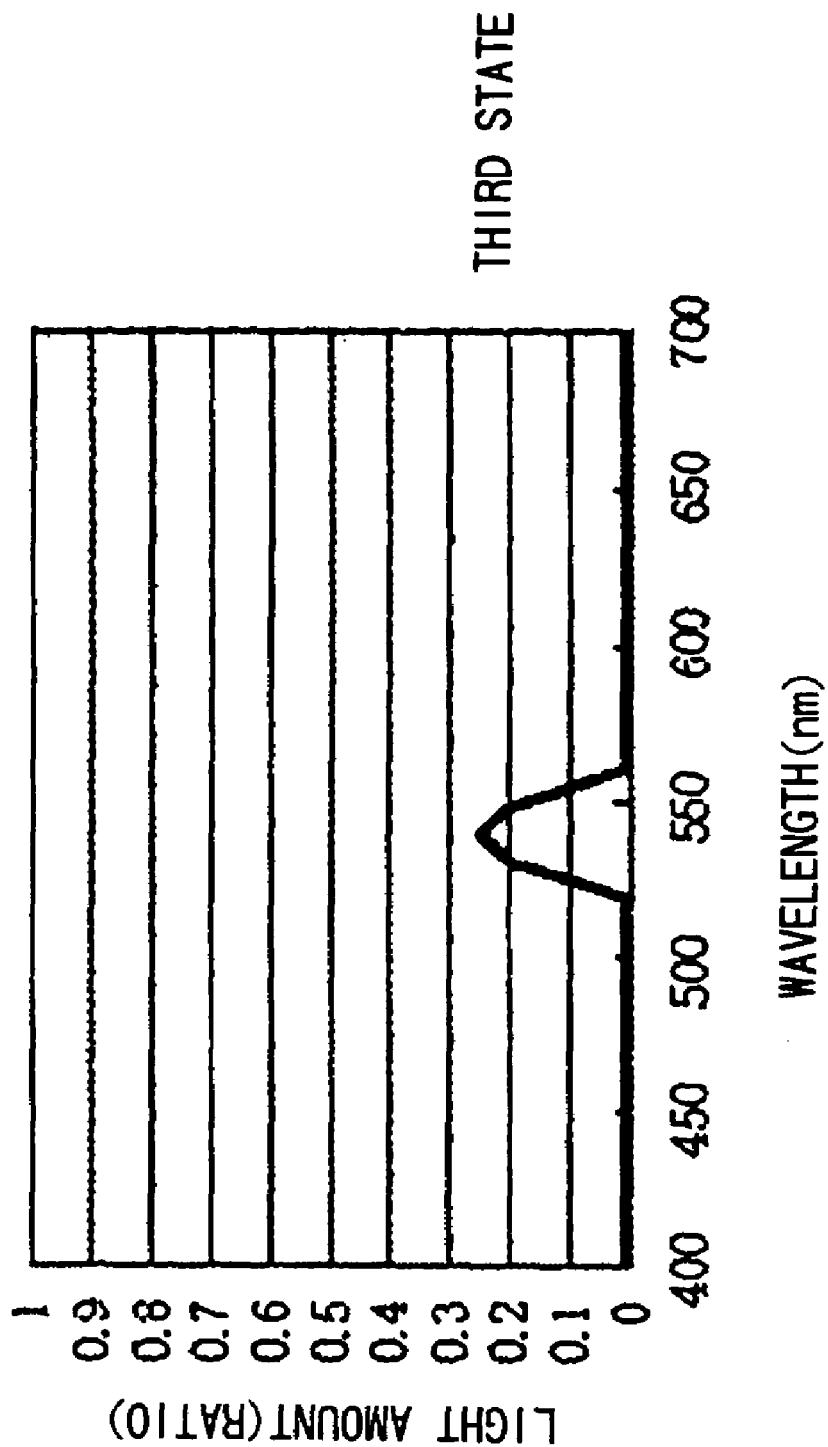

COLOR SPLITTING/COMBINING OPTICAL SYSTEM AND IMAGE PROJECTING APPARATUS

BACKGROUND OF THE INVENTION

1. Field of the Invention

The present invention relates to a color splitting/combining optical system used for an image projection apparatus (projector) for projecting light from image-forming elements which form an original picture.

2. Description of Related Art

An image projection apparatus in which reflection type liquid crystal display elements and a polarization beam splitter are combined with each other is disclosed by Japanese Patent Application Laid-open No. 2001-154268. The corresponding image projection apparatus is an image projection apparatus having a white-color light source 1001, reflection type liquid crystal display elements 1002R, 1002G and 1002B, and a projection optical system 1003 as shown in FIG. 33. In the corresponding image projection apparatus, a dichroic mirror 1004 is provided between the white-color light source 1001 and the reflection type liquid crystal display elements 1002R, 1002G and 1002B. Further, the apparatus includes a color splitting system in which polarization beam splitters 1005 and 1006 are provided between the dichroic mirror 1004 and the reflection type liquid crystal display elements 1002R, 1002G and 1002B, and a color combining system in which the first, second and third polarization beam splitters 1005, 1006 and 1007 are provided between the reflection type liquid crystal display elements and the projection optical system.

Herein, the first color-selective wave plate 1008 capable of rotating the polarization direction of light of a predetermined wavelength region by 90 degrees is provided between the dichroic mirror 1004 and the second polarization beam splitter 1006, and the second color-selective wave plate 1009 is provided between the second polarization beam splitter 1006 and the third polarization beam splitter 1007, wherein color components (R and B) and polarization directions (P and S) are associated with each other, and color splitting and combining are carried out by polarization beam splitters.

Thereby, white-color light from the white-color light source 1001 is split into a first color light path (G) and a second-color light paths (R and B) by the dichroic mirror 1004. And, the polarization direction of B-color light is rotated by 90 degrees by the first color-selective wave plate 1008, wherein the B-color light is made into P-polarized light, and R-color light is made into S-polarized light, and the respective lights are split into a third-color light path (R) and a fourth-color light path by the second polarization beam splitter 1006.

Further, in the first light path, light reflected by the first polarization beam splitter 1005 is further reflected with the polarization direction thereof rotated by 90 degrees by the first reflection type liquid crystal display element 1002G, is transmitted through the first polarization beam splitter 1005, and reaches the projection optical system 1003 after being reflected by the third polarization beam splitter 1007. And, in the third light path, the polarization direction thereof is rotated by 90 degrees by the second reflection type liquid crystal display element 1002R, and the light is transmitted through the second polarization beam splitter 1006. Further, in the fourth light path, the polarization direction is rotated by 90 degrees by the second reflection type liquid crystal display element 1002B. Then, two color lights (R and B) are combined into a single light flux after being reflected by the second polarization beam splitter 1006. And, the polarization direction of B-color light is rotated by 90 degrees by the second color-selective wave plate 1009, and color light of R and B is made into P-polarized light and reaches the projection optical system 1003 after being transmitted through the third polarization beam splitter 1007, wherein a three-color image is combined.

However, since, in the conventional example, a color-selective wave plate having the same characteristics in terms of rotational polarization is used for the first and second color-selective wave plates 1008 and 1009, which are installed at the incidence side and emergence side of the second polarization beam splitter 1006, unnecessary polarized light components occur in a region of transition (hereinafter called a "transition region") in which the characteristics of rotational polarization is converted from 0 degrees (no rotation is brought about) to 90 degrees.

A detailed description is given of the problem. FIG. 34 expresses characteristics of rotational polarization of a color-selective wave plate used in the prior art example. The color-selective wave plate is featured in that polarization is rotated by 90 degrees in a wavelength region of blue (B) and the polarization is not rotated in a wavelength region of red (R), and the wavelength region between the regions is a transition region. FIG. 34 is a characteristic view showing actions of rotating the polarization of the color-selective wave plate. In another view, the characteristic expresses the ratio of polarized light components orthogonal to incident polarized light components in incident linear polarization (when the ratio is 1, the polarization direction is rotated by 90 degrees). Therefore, in the drawing, a scale expressing the ratio (percentage) of polarized light components orthogonal to the incident polarization component is described on the right side of the graph.

In this case, a description is given of how the incident linear polarization light is converted, based on respective combinations of color-selective wave plates.

A first state shows a case where the polarization direction is rotated by 90 degrees with the first and second color-selective wave plates. When a characteristic for expressing the ratio of polarized light components orthogonal to incident polarization is I(λ), and a characteristic expressed by $$C1(\lambda) = I(\lambda) \times I(\lambda)$$

is C1(λ), it is possible to express the ratio (percentage) of light amount for which polarization direction is rotated by 90 degrees with the first and second color-selective wave plates. CI(λ) is shown in FIG. 35.

A second state is a case where the polarization direction is not rotated with the first and second color-selective wave plates. Where it is assumed that a characteristic expressed by $$C2(\lambda) = (1 - I(\lambda)) \times (1 - I(\lambda))$$

is C2(λ), it is possible to express the ratio of light amount for which the polarization direction is not rotated by the first and second color-selective wave plate. C2(λ) is shown in FIG. 36.

A third state is a case where the polarization direction is rotated by 90 degrees with the first color-selective wave plate and the polarization direction is not rotated with the second color-selective wave plate. Where it is assumed that a characteristic expressed by $$C3(\lambda) = I(\lambda) \times (1 - I(\lambda))$$

is C3(λ), it is possible to express the ratio of light amount for which the polarization direction is rotated by 90 degrees by the first color-selective wave plate and the polarization direction is not rotated with the second color-selective wave plate. C3(λ) is shown in FIG. 37.

A fourth state is a case where the polarization direction is not rotated with the first color-selective wave plate and the polarization direction is rotated by 90 degrees with the second color-selective wave plate. Where the characteristic expressed by $$C4(\lambda)=(1-I(\lambda))\times I(\lambda)$$

is made into C4(λ), it is possible to express the ratio of the light amount for which the polarization direction is not rotated with the first color-selective wave plate but the polarization direction is rotated by 90 degrees with the second color-selective wave plate. The C4(λ) will have the same characteristic as that of C3(λ).

Although the first state corresponds to the B component and the second state corresponds to the R component, it is found that unnecessary transition characteristics occur in the transition region of the color-selective wave plate in the third and fourth states other than the above.

Next, a description is given of an influence which the unnecessary components in an optical system shown with a conventional example exert on the contrast of an image projection apparatus.

The influence exerted on the contrast is an amount of light leaking into the projection optical system when a reflection type liquid crystal display element is displayed in black. In the third state, light is made incident into the second polarization beam splitter 1006 as a P-polarized component by the first color-selective wave plate, is transmitted through the polarization splitting film and is reflected with the polarization state not changed by the reflection type liquid crystal display element (that is, with the display in black). And, the light is again made incident into the second polarization beam splitter 1006 as a P-polarized component, is reflected by the polarization splitting film, and is transmitted through the third polarization beam splitter 1007, as it is, as the P-polarized component without being subjected to any rotating action of polarization direction by the second color-selective wave plate. Thus progressing light is reflected by the reflection type image display element and is once analyzed when being reflected as the P-polarized light from the polarization splitting film of the second polarization beam splitter 1006. However, it is not analyzed with respect to the third polarization beam splitter 1007 since it is made incident as the P-polarized light in the transmitting polarization direction. Resultantly, in the third state, the leakage light amount is remarkably increased relative to the first state brought about by a normal action.

This cannot be cut even if a polarization plate is provided between the second polarization beam splitter 1006 and the third polarization beam splitter 1007 as shown in the conventional example.

In the fourth state, the light is made incident into the second polarization beam splitter 1006 as S-polarized light, is reflected by the polarization splitting film and is reflected by the reflection type liquid crystal display element with the polarization state not changed (that is, with display in black) and is again incident into the second polarization beam. And, the light is transmitted through the polarization splitting film and is transmitted through the third polarization beam splitter 1007, as it is, as the P-polarized component by being subjected to a rotating action of polarization by the second color-selective wave plate. Thus progressing light is not analyzed since it is made incident into the third polarization beam splitter 1007 as P-polarized light in the transmitting polarization direction. Resultantly, in the fourth state, the leakage light amount will be increased relatve to the second state brought about by a normal action as in the third state.

The conventional example describes that the transition region of the color-selective wave plate is set to a wavelength region cut by a dichroic mirror.

However, since the reflectivity of the dichroic mirror is not 100% and the wavelength characteristics thereof shift in accordance with the incident angle, it is impossible that the light amount in the transition region is made into zero. Therefore, it has been made clear by research that the conventional structure is insufficient as an optical system to secure high-quality contrast.

SUMMARY OF THE INVENTION

It is therefore an object of the invention to provide a color splitting/combining optical system, in which color-selective wave plates and polarization splitting surface (film) are combined with each other, capable of reducing a leakage light amount when display is made in black and securing a display image of high contrast.

In order to achieve the object, an aspect of the present invention resides in a color splitting/combining optical system including the following.

The corresponding optical system includes a first optical member which splits light from a light source into a first color light component and a second color light component, and a second optical member having a polarization splitting surface. The first optical member directs the first color light component to a first image-forming element. The second optical member has a polarization splitting film and splits the second color light component into a third color light component and a fourth color light component by using the polarization splitting surface, wherein the third color light component is directed to a second image-forming element, and the fourth color light component is directed to a third image-forming element. Further, the second optical member combines the third color light component from the second image-forming element and the fourth color light component from the third image-forming element together by using the polarization splitting surface.

In addition, the optical system includes a third optical member which combines the third and fourth color light components combined by the second optical member with the first color light component from the first image-forming element.

Also, the optical system includes a first color-selective wave plate disposed between the first optical member and the second optical member, and a second color-selective wave plate disposed between the second optical member and the third optical member. The first color-selective wave plate converts the polarization direction of a light component in a first wavelength region by 90 degrees. The second color-selective wave plate converts the polarization direction of a light component in a second wavelength region by 90 degrees, wherein the following condition is satisfied.

$$\lambda1 \neq \lambda2$$

where λ1 represents a wavelength for which the ratio of the light component having the polarization direction converted by 90 degrees by the first color-selective wave plate becomes substantially 50% and λ2 represents a wavelength for which the ratio of the light component having the polarization direction converted by 90 degrees by the second color-selective wave plate becomes substantially 50%.

Also, another aspect of the present invention resides in a color splitting/combining optical system including the following. The optical system includes a first optical member which splits light from a light source into a first color light component and a second color light component, and a second optical member having a polarization splitting surface. The first optical member directs the first color light component to a first image-forming element. The second optical member splits the second color light component into a third color component and a fourth color component by using the polarization splitting surface, directs the third color light component to a second image-forming element, and directs the fourth color light component to a third image-forming element. Further, the second optical member combines the third color light component from the second image-forming element and the fourth color light component from the third image-forming element together by using the polarization splitting surface.

In addition, the optical system includes a third optical member which combines the third and fourth color light components combined by the second optical member with the first color light component from the first image-forming element.

Further, the optical system includes a first color-selective wave plate disposed between the first optical member and the second optical member, and a second color-selective wave plate disposed between the second optical member and the third optical member. The first color-selective wave plate converts the polarization direction of a light component in a first wavelength region by 90 degrees. The second color-selective wave plate converts the polarization direction of a light component in the second wavelength region by 90 degrees.

Still further, the optical system includes a color filter disposed between the first optical member and the first color-selective wave plate. The color filter has substantially continuously a first optical transmission band, optical non-transmission band and second optical transmission band from a short-wavelength side to a long-wavelength side.

And, the optical system meets the following condition.

$$\lambda c1 < \lambda 0 < \lambda c2$$

where $\lambda c1$ represents a wavelength for which the transmittance in a first transition region from the first optical transmission band to the optical non-transmission band becomes substantially 50%, $\lambda c2$ represents a wavelength for which the transmittance in a second transition region from the optical non-transmission band to the second optical transmission band becomes substantially 50%, and $\lambda 0$ represents $(\lambda 1+\lambda 2)/2$, and where $\lambda 1$ represents a wavelength for which the ratio of the light component having the polarization direction converted by 90 degrees by the first color-selective wave plate becomes substantially 50% and $\lambda 2$ represents a wavelength for which the ratio of the light component having the polarization direction converted by 90 degrees by the second color-selective wave plate becomes substantially 50%.

Features and advantages of a color splitting/combining optical system according to the invention and an image projection apparatus using the same will be made clear based on the following description of detailed embodiments with reference to the accompanying drawings.

BRIEF DESCRIPTION OF THE DRAWINGS

FIG. 37 is a view showing the ratio of light amount by a color-selective wave plate in the third and fourth states of the conventional example.

DETAILED DESCRIPTION OF THE PREFERRED EMBODIMENTS (Embodiment 1)

Figure 1:
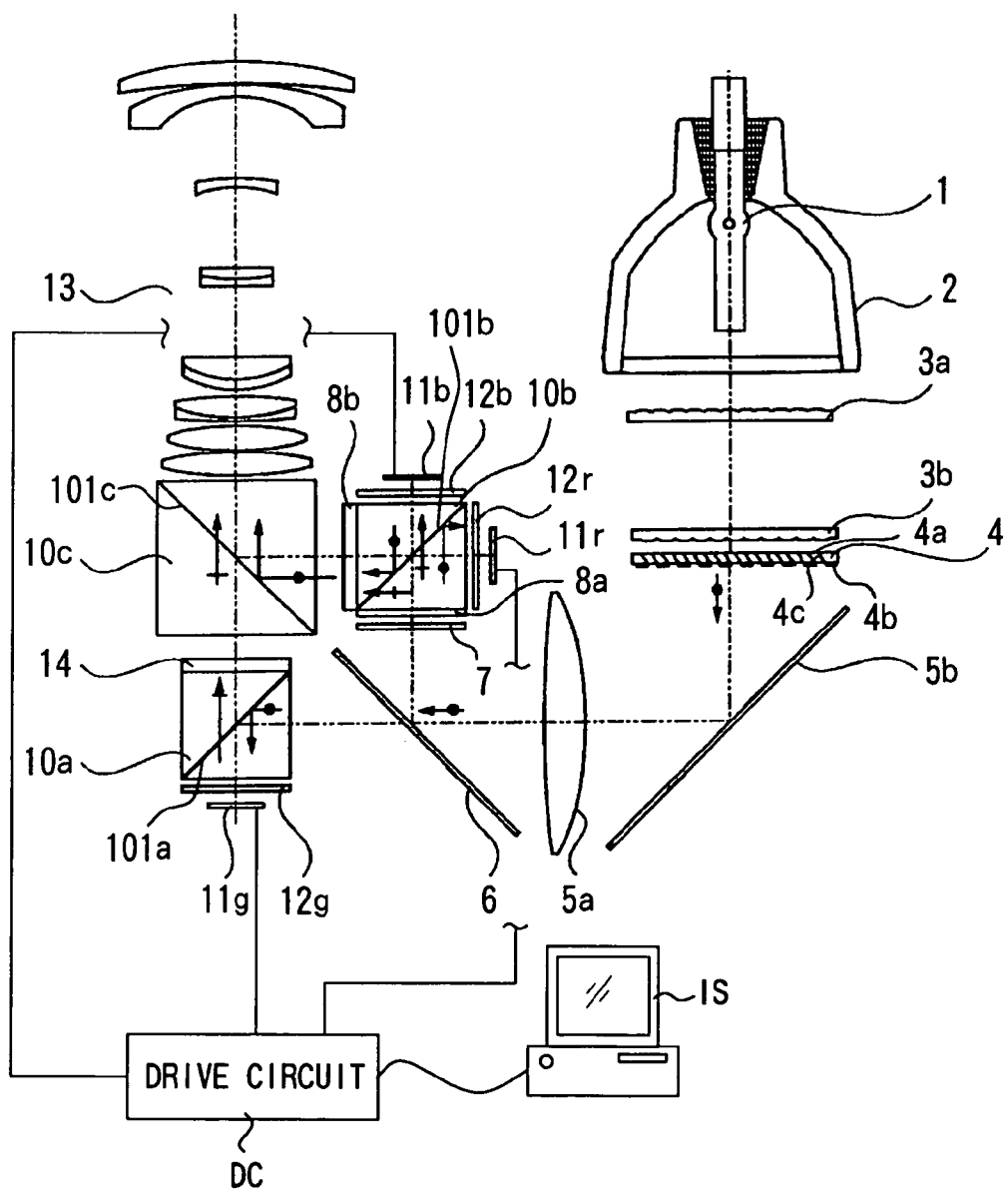
FIG. 1 is a view representing Embodiment 1 according to the present invention.

FIG. 1 is a view representing Embodiment 1 according to the present invention. In the drawing, Reference Numeral 1 denotes a light source which emits white-color light with a continuous spectrum. Reference Numeral 2 denotes a reflector which condenses light in a predetermined direction. Reference Numeral 3a denotes a first fly-eye lens having rectangular lenses disposed in a matrix state, and 3b denotes a second fly-eye lens constituted by lens arrays corresponding to respective lenses of the first fly-eye lens.

Reference Numeral 4 denotes a polarization converting element which makes non-polarized light into predetermined polarized light. Reference Numeral 5a denotes a condenser lens and 5b denotes a mirror. Reference Numeral 6 denotes a dichroic mirror which is a first optical member, which reflects light components of wavelength regions of blue (B) and red (R) and transmits a light component of a wavelength region of green (G).

Reference Numeral 7 denotes a color filter which cuts light of an intermediate wavelength region between B and R. Reference Numeral 8a denotes a first color-selective wave plate which converts the polarization direction of a light component of B by 90 degrees but does not convert the polarization direction of a light component of R, and 8b denotes a second color-selective wave plate which converts the polarization direction of the light component of R by 90 degrees but does not convert the polarization direction of the light component of B. Reference Numerals 10a, 10b and 10c, respectively denote a first polarization beam splitter, a second polarization beam splitter and a third polarization beam splitter. These have polarization splitting films (polarization splitting surfaces) 101a, 101b and 101c, each of which transmits P-polarized light and reflects S-polarized light. The second polarization beam splitter is provided as a second optical member, and the third polarization beam splitter is provided as a third optical member. Reference Numerals 11r, 11g and 11b, respectively, denote a reflection type liquid crystal display element for red, a reflection type liquid crystal display element for green, and a reflection type liquid crystal display element for blue, each of which reflects light and displays an original image by modulating light. A drive circuit DC is connected to these liquid crystal display elements (image-forming elements). Image information supplying apparatus IS such as a personal computer, DVD player, and television tuner, etc., are connected to the drive circuit DC. When an image signal is input from the image information supplying apparatus IS into the drive circuit DC, the drive circuit DC drives the respective liquid crystal display elements in response to the image signal, whereby an original image of corresponding color is formed (displayed) on the respective liquid crystal display elements. Also, although this point is not illustrated, it can be the same in the other embodiments.

Reference Numerals 12r, 12g and 12b, respectively, denote a ¼-wave plate for red, a ¼-wave plate for green, and a ¼-wave plate for blue. Reference Numeral 13 denotes a projection lens, and 14 denotes a glass plate for regulating an optical path length of the projection optical system.

Figure 2:
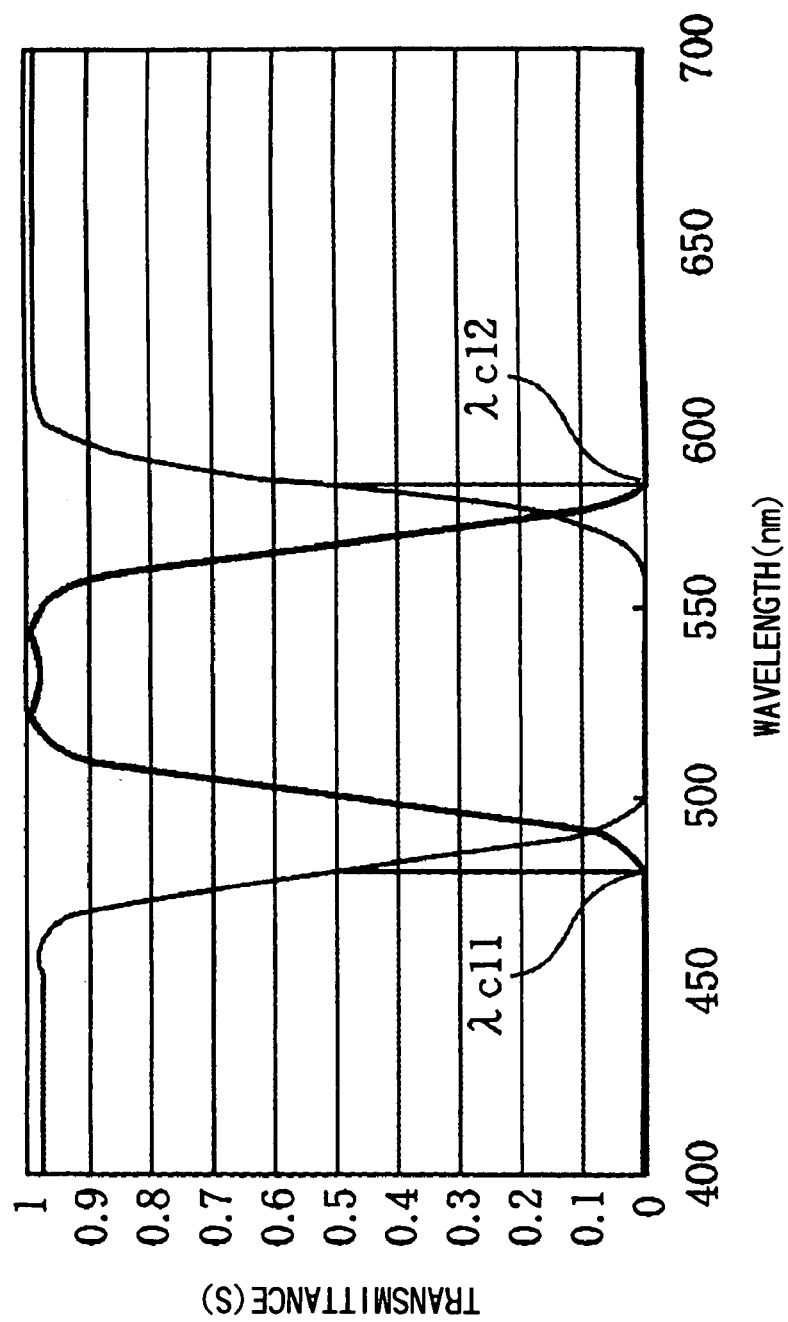
FIG. 2 is a view showing the characteristics of a dichroic mirror and a color filter according to Embodiment 1.
Figure 3:
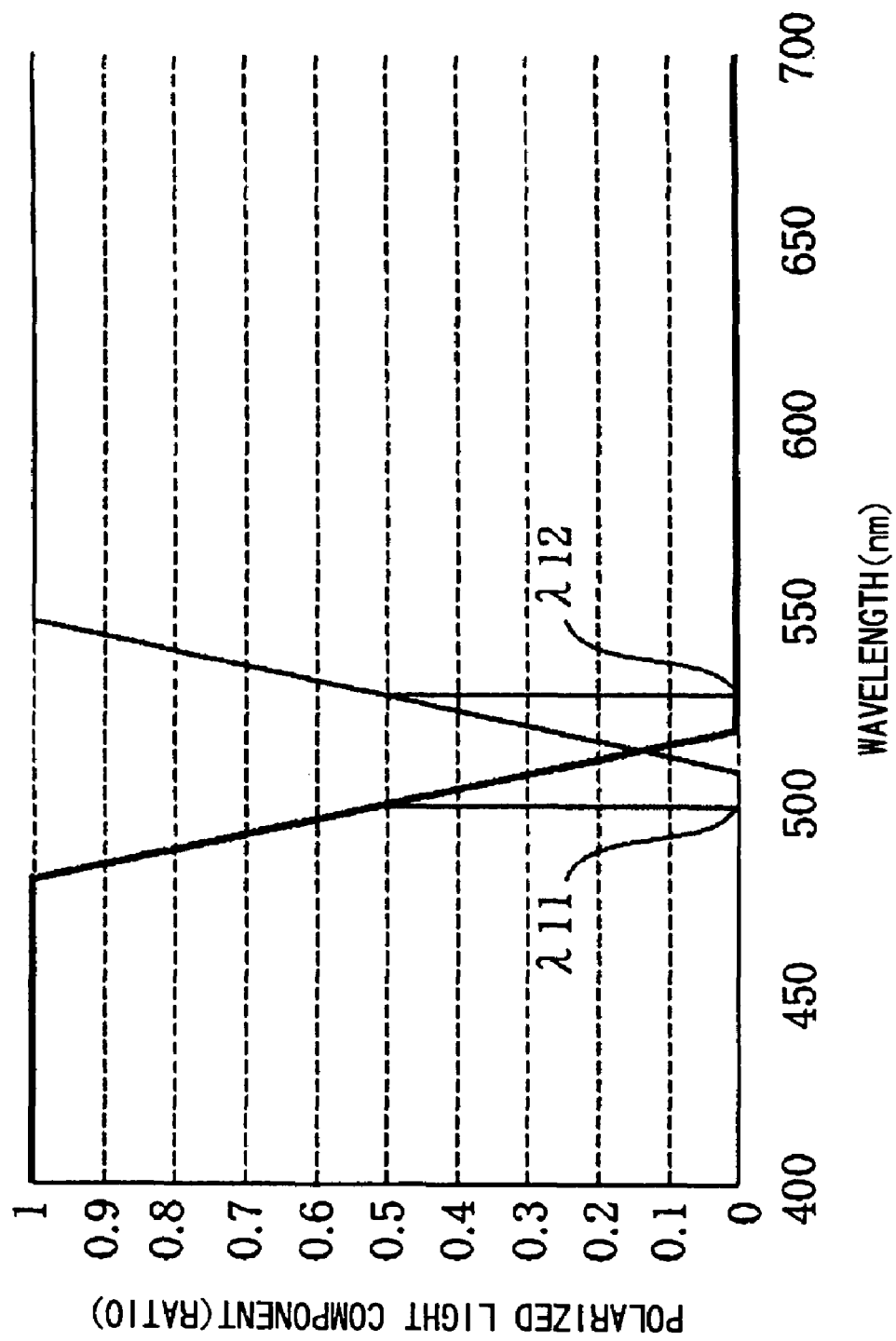
FIG. 3 is a view showing the characteristics of a color-selective wave plate according to Embodiment 1.

FIG. 2 shows the characteristics of a dichroic mirror for an S-polarized component according to the present embodiment with a thick line and shows the characteristics of a color filter according to the present embodiment with a thin line. Further, FIG. 3 shows the characteristics of the first color-selective wave plate with thick lines and shows those of the second color-selective wave plate with thin lines.

Next, a description is given of optical actions. Light emitted from the light source 1 is condensed in a predetermined direction by the reflector 2. Here, the reflector 2 is shaped to be parabolic. The light source is disposed at the focus of the parabolic reflector 2. The light from the focal position of the parabolic surface becomes a light flux parallel to the axis of symmetry axis of the parabolic surface. However, since the light source 1 is not an ideal spot light source but has a finite size, the condensed light flux includes many light components which are not parallel to the symmetry axis of the parabolic surface. These condensed light fluxes are made incident into the first fly-eye lens 3a.

The first fly-eye lens 3a is constructed by arranging lenses each having positive refractive power, the outer shape of which is rectangular, in the form of a matrix. The first fly-eye lens 3a splits an incident light flux into a plurality of light fluxes responsive to the respective lenses, and condenses them and forms a plurality of light source images in the vicinity of the polarization converting element in the form of a matrix via the second fly-eye lens 3b.

The polarization converting element 4 is composed of polarization splitting surfaces 4a, reflection surfaces 4b, and ½-wave plates 4c. A plurality of light fluxes condensed in the form of a matrix are made incident into the polarization converting element 4 at positions corresponding to rows of the respective light fluxes, and are split into a transmitting P-polarized light component and a reflecting S-polarized component by the polarization splitting surfaces 4a. The reflected S-polarized component is reflected by the reflection surface 4b and emerges into the same direction of the P-polarized light component. On the other hand, the transmitted P-polarized light component is transmitted through the ½-wave plate 4c, converted to the same polarized light component as the S-polarized light component, and emerges as light whose polarization directions (•) are well aligned. A plurality of polarization-converted light fluxes reach the condenser lens 5a as divergence light fluxes after emerging from the polarization converting element 4.

In FIG. 1, light which was S-polarized light in the polarization converting element 4 also is S-polarized light (•) with respect to the dichroic mirror 6.

In the optical path of the light component of G, the light component of G transmitted through the dichroic mirror 6 is made incident into the first polarization beam splitter 10a as S-polarized light(•), is reflected by the polarization splitting surface 101a of the first polarization beam splitter 10a, and reaches the reflection type liquid crystal display element 11g for G. The light component of G is image-modulated and reflected by the reflection type liquid crystal display element 11g for G. The S-polarized component (•) of the image-modulated reflection light component of G is reflected by the polarization splitting surface 101a of the first polarization beam splitter 10a again, is returned to the light source side and eliminated from projection light. The P-polarized light component (l) of the image-modulated reflection light component of G is transmitted through the polarization splitting surface 101a of the first polarization beam splitter 10a and is made into projection light. The light (l) transmitted through the first polarization beam splitter 10a is transmitted through the polarization splitting surface 101c of the third polarization beam splitter 10c and reaches the projection lens 13.

The light components of R and B reflected by the dichroic mirror 6 are made incident into the color filter 7, wherein color light component in the wavelength region between B and R is reflected. The light components of R and B thus color-adjusted are made incident into the first color-selective wave plate 8a. The first color-selective wave plate has an action of rotating the polarization direction of only the light component of B by 90 degrees, wherein the light component of B is made incident into the second polarization beam splitter 10b as P-polarized light (l) and the light component of R is made incident into the second polarization beam splitter 10b as S-polarized light (•). Therefore, in the second polarization beam splitter 10b, the light component of B is transmitted through the polarization splitting surface 101b of the second polarization beam splitter 10b and reaches the reflection type liquid crystal display element 11b for B while the light component of R is reflected by the polarization splitting surface 101b of the second polarization beam splitter 10b and reaches the reflection type liquid crystal display element 11r for R.

The light component of B is image-modulated and reflected by the reflection type liquid crystal display element 11b for B. The P-polarized light component (l) of the image-modulated reflection light component of B is transmitted again through the polarization splitting surface 101b of the second polarization beam splitter 10b, is returned to the light source side and eliminated from projection light. The S-polarized light component (•) of the image-modulated reflection light component of B is reflected by the polarization splitting surface 101b of the second polarization beam splitter 10b.

Similarly, the light component of R is image-modulated and reflected by the reflection type liquid crystal display element 11r for R. The S-polarized light component (•) of the image-modulated reflection light component of R is reflected again by the polarization splitting surface 101b of the second polarization beam splitter 10b, is returned to the light source side and eliminated from projection light. The P-polarized light component (l) of the image-modulated reflection light component of R is transmitted through the polarization splitting surface 101b of the second polarization beam splitter 10b and is made into projection light, whereby the projection light components of B and R are combined to be a single light flux.

The combined projection light components of R and B are made incident into the second color-selective wave plate 8b. The second color-selective wave plate 8b rotates only the polarization direction of the light component of R by 90 degrees, the projection light components of R and B are made incident as S-polarized light components (•) into the third polarization beam splitter 10c. Since the light components of R and B are reflected by the polarization splitting surface 101c of the third polarization beam splitter 10c, the light components of R and B are combined with the projection light component of G.

The combined projection light components of R, G and B are projected onto a screen by the projection lens 13.

Herein, where 50% wavelength λ11 of the first color-selective wave plate 8a is compared with 50% wavelength λ12 of the second color-selective wave plate 8b as shown in FIG. 3, these are set so as to satisfy:

$$\lambda 11 \neq \lambda 12$$

and $$\lambda 11 < \lambda 12.$$

Here, the 50% wavelengths (λ11 and λ12) of the first and second color-selective wave plate are wavelengths in which the ratio of a light component whose polarization direction is converted by 90 degrees by the first color-selective wave plate and the second color-selective wave plate becomes substantially 50%, respectively. This is the same for the following embodiments.

Thereby, a light component in the wavelength region between the two wavelengths λ11 and λ12 is made incident into the second polarization beam splitter 10b as S-polarized light.

Also, when 50% wavelengths of the color filter 7 shown in FIG. 2 are λc11 and λc12, and λ10 is expressed by:

$$\lambda 10 = (\lambda c 11 + \lambda c 12)/2,$$

these are set so as to satisfy:

$$\lambda 11 < \lambda 10 < \lambda 12.$$

Here, the 50% wavelengths (λc11 and λc12) of the color filter 7 are wavelengths in which the transmittance in a first and second transition regions described later becomes substantially 50%, respectively. The first transition region is a region in which the transmittance of light (for example, the light component of R) changes from the first transmission band to a non-transmission band. The second transition region is a region in which the transmittance of light (for example, the light component of B) changes from the non-transmission band to the second transmission band. These are the same for the following embodiments.

(Embodiment 2)

Figure 4:
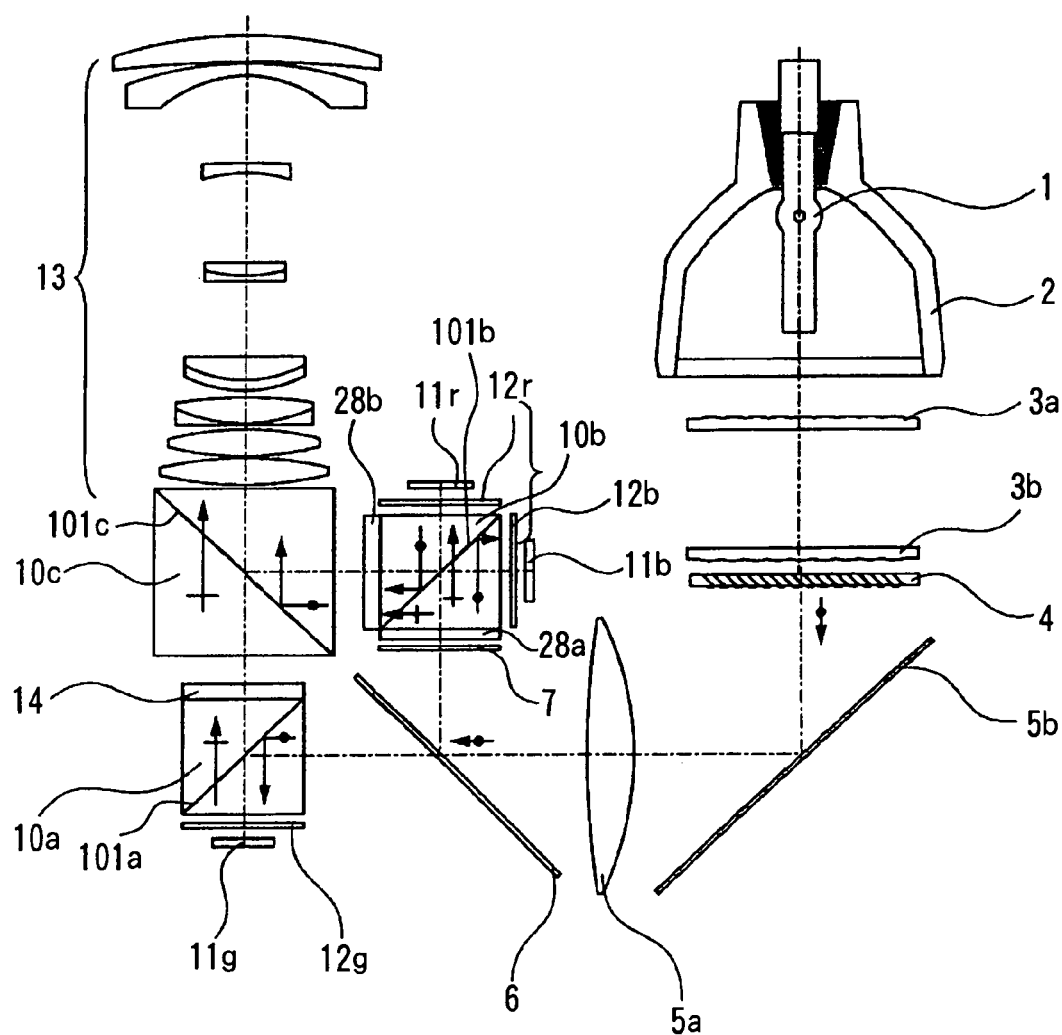
FIG. 4 is a view representing Embodiment 2 according to the present invention.

FIG. 4 is a view representing Embodiment 2 according to the present invention, wherein parts which are identical to those in Embodiment 1 are given the same Reference Numerals. A point in which Embodiment 2 differs from Embodiment 1 resides in that the arrangement of the reflection type liquid crystal display element for R and the reflection type liquid crystal display element for B is reversed. Therefore, in Embodiment 2, the first color-selective wave plate 28a which converts the polarization direction of the light component of R by 90 degrees but does not convert the polarization direction of the light component of B, and the second color-selective wave plate 28b which converts the polarization direction of the light component of B by 90 degrees but does not convert the polarization direction of the light component of R are provided.

Figure 5:
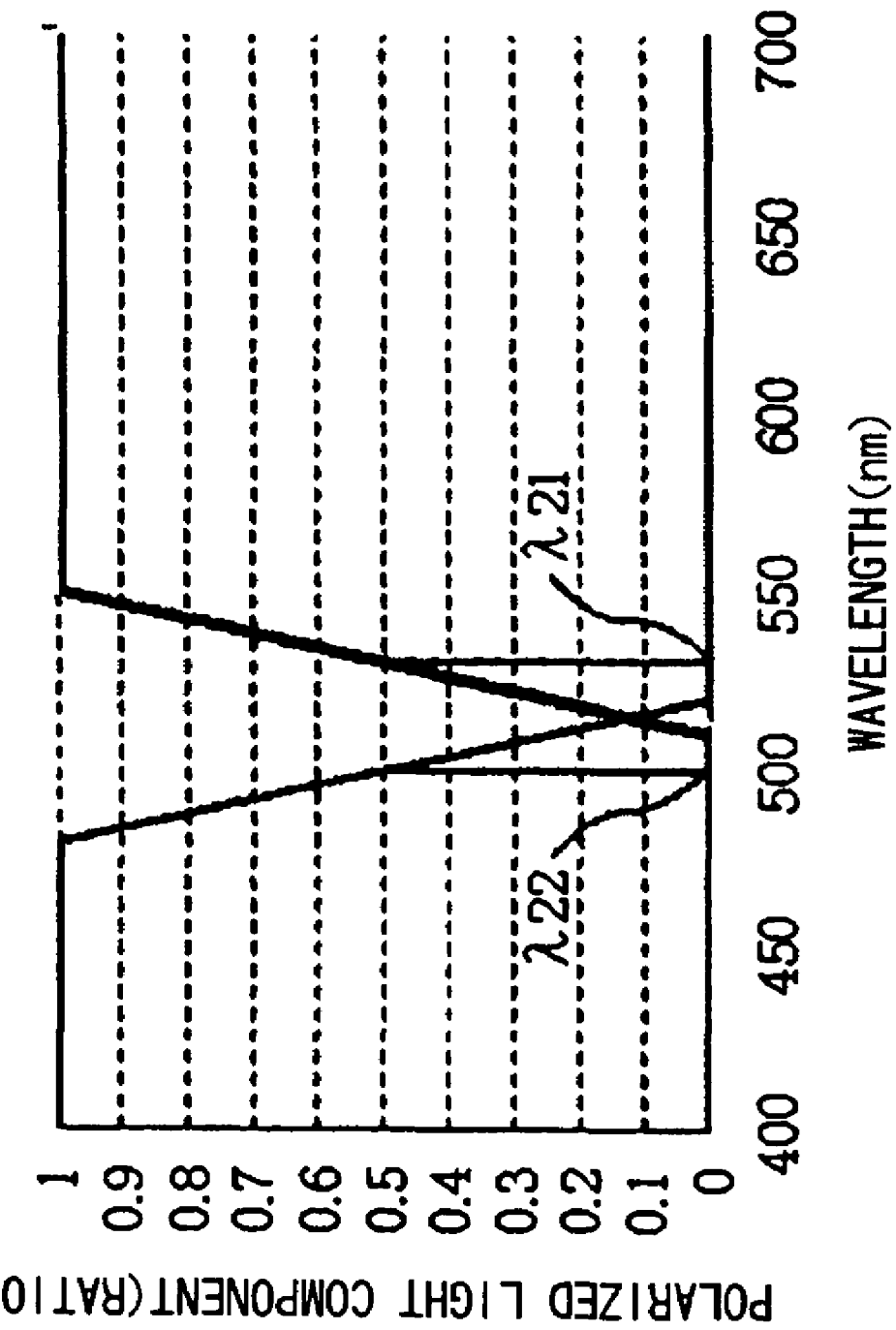
FIG. 5 is a view showing the characteristics of a color-selective wave plate according to Embodiment 2.

FIG. 5 shows the characteristics of the first color-selective wave plate according to the present embodiment with thick lines, and shows the characteristics of the second-selective wave plate according to the present embodiment with thin lines. The characteristics of the color filter are the same as those in Embodiment 1.

Thereby, light components of R and B reflected by the dichroic mirror 6 are made incident into the first color-selective wave plate 28a after the colors thereof are adjusted by the color filter 7. The first color-selective wave plate has an action of rotating the polarization direction of only the light component of R by 90 degrees, whereby the light component of R is made incident into the second polarization beam splitter 10*b* as P-polarized light (|). The light component of B is made incident thereinto as S-polarized light (•). Therefore, in the second polarization beam splitter 10*b*, the light component of B is reflected by the polarization splitting surface 101*b* and reaches the reflection type liquid crystal display element 11*b* for B, and the light component of R is transmitted through the polarization splitting surface 101*b* of the second polarization beam splitter 10*b* and reaches the reflection type liquid crystal display element 11*r* for R.

By the reflection type liquid crystal display element 11*b* for B, the light component of B is image-modulated and reflected. The S-polarized light component (•) of the image-modulated reflection light component of B is reflected again by the polarization splitting surface 101*b* of the second polarization beam splitter 10*b*, is returned to the light source side and eliminated from projection light. The P-polarized light component (|) of the image-modulated reflection light component of B is transmitted through the polarization splitting surface 101*b* of the second polarization beam splitter 10*b* and is made into projection light. Similarly, the light component of R is image-modulated and reflected by the reflection type liquid crystal display element 11*r* for R. The P-polarized light component (|) of the image-modulated reflection light component of R is transmitted again through the polarization splitting surface 101*b* of the second polarization beam splitter 10*b*, is returned to the light source side and eliminated from projection light. The S-polarized light component (•) of the image-modulated reflection light component of R is reflected by the polarization splitting surface 101*b* of the second polarization beam splitter 10*b* and is made into projection light, wherein projection light components of B and R are combined to be a single light flux.

The combined projection light components of R and B are made incident into the second color-selective wave plate 28*b*. The second color-selective wave plate 28*b* rotates the polarization direction of the light component of B by 90 degrees, both light components of R and B are made incident into the third polarization beam splitter 10*c* as S-polarized light (•), and are reflected by the polarization splitting surface 101*c* of the third polarization beam splitter 10*c*, wherein the light components of R and B are combined with the projection light component of G.

The projection light components of R, G and B which are combined are projected onto a screen by the projection lens 13.

Herein, where 50% wavelength λ21 of the first color-selective wave plate 28*a* is compared with 50% wavelength λ22 of the second color-selective wave plate 28*b*, these are set so as to satisfy:

λ21≠λ22 and

λ21>λ22.

Thereby, a light component in the wavelength region between the two wavelengths λ21 and λ22 is made incident into the second polarization beam splitter 10*b* as S-polarized light.

(Embodiment 3)

Figure 6:
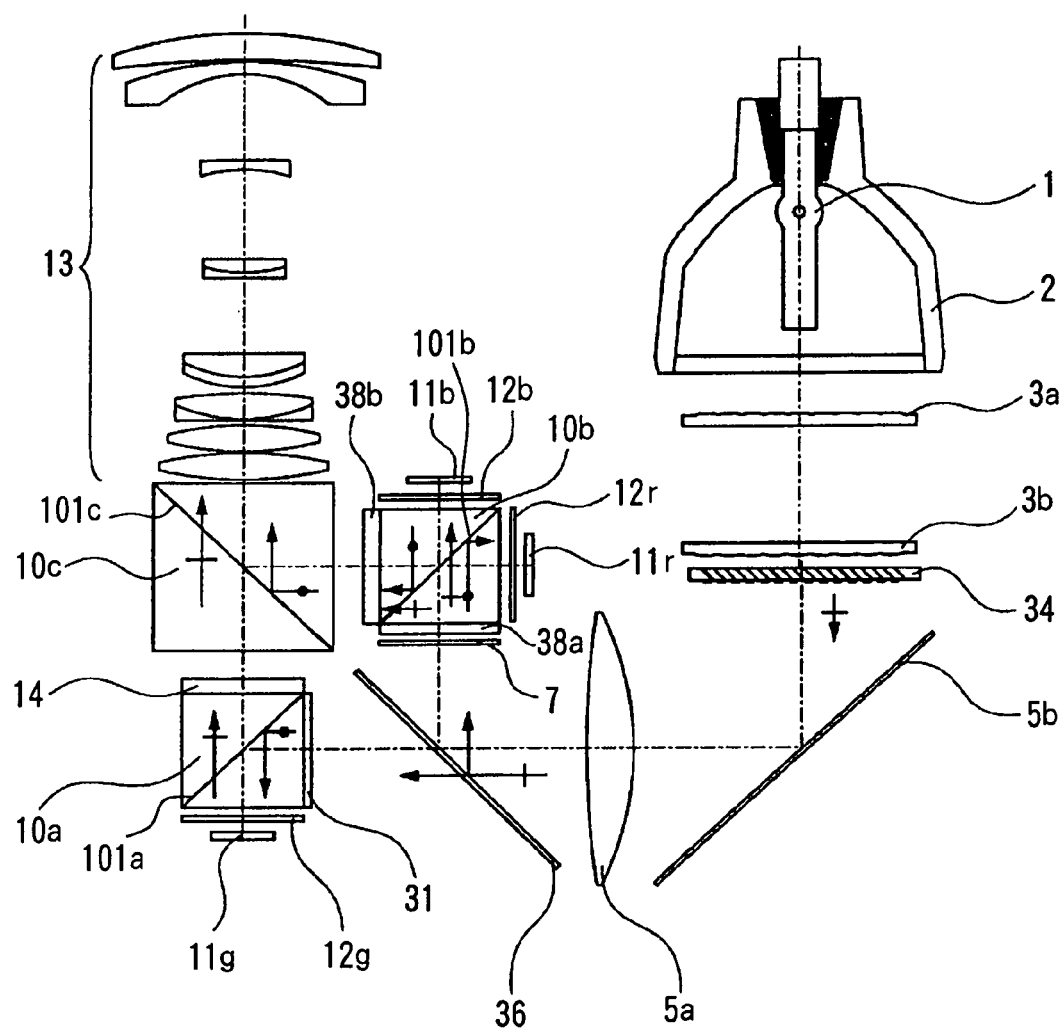
FIG. 6 is a view representing Embodiment 3 according to the present invention.

FIG. 6 is a view representing Embodiment 3 according to the present invention, wherein parts which are identical to those of Embodiment 1 are given the same Reference Numerals. A point in which Embodiment 3 differs from Embodiment 1 resides in that Embodiment 3 is provided with a polarization converting element 34 by which non-polarized light is aligned to be P-polarized light. Therefore, a first color-selective wave plate 38*a* which converts the polarization direction of the light component of R by 90 degrees but does not convert the polarization direction of the light component of B, and a second color-selective wave plate 38*b* which rotates the polarization direction of the light component of R by 90 degrees but does not convert the polarization direction of the light component of B are provided therein, and the ½ wave plate 31 which converts the polarization direction of light G by 90 degrees is provided at the incidence side of the first polarization beam splitter 10*a*, and a dichroic mirror 36 which splits P-polarized light into light components of predetermined wavelengths is provided therein.

Figure 7:
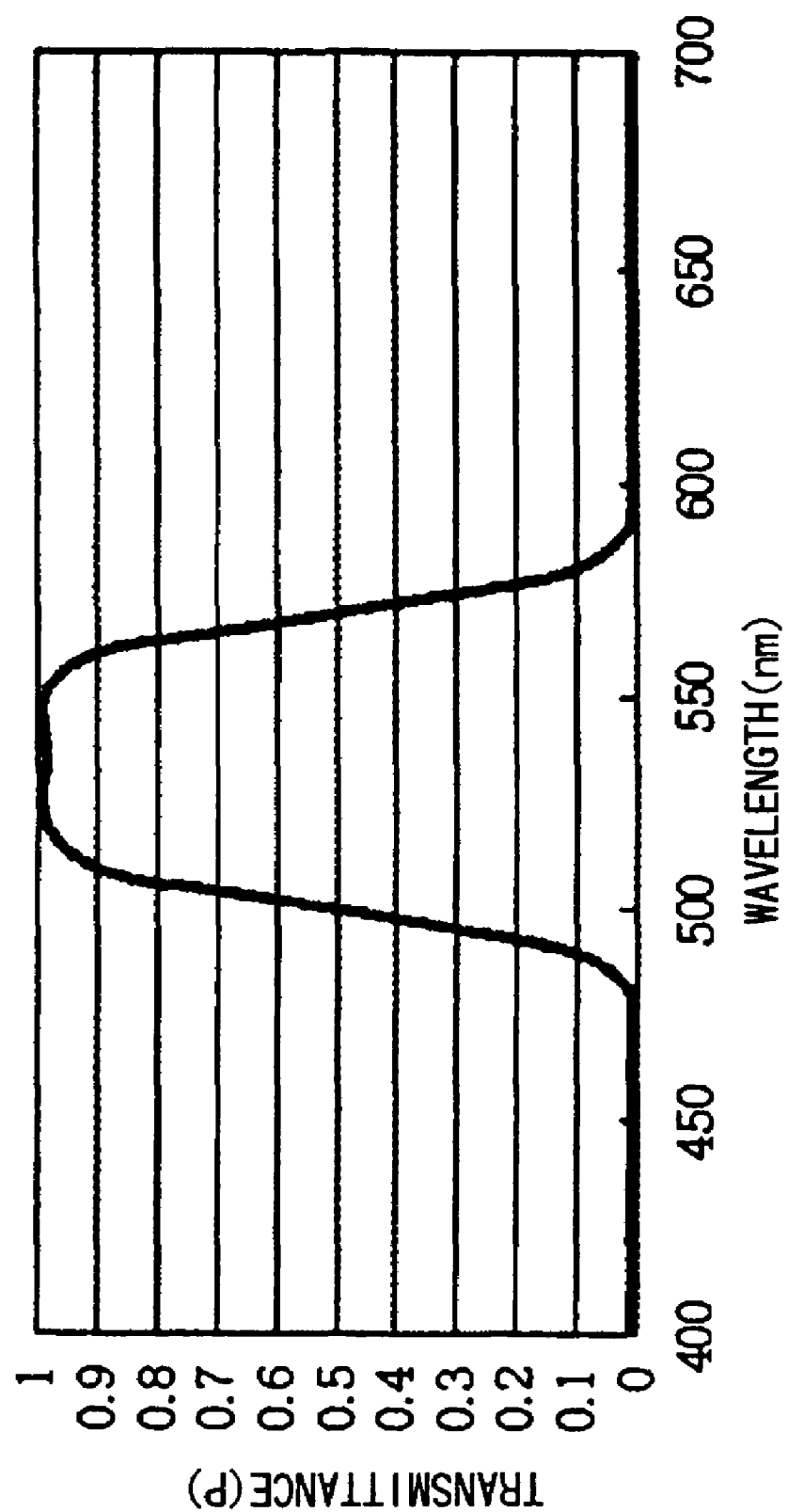
FIG. 7 is a view showing the characteristics of a dichroic mirror according to Embodiment 3.
Figure 8:
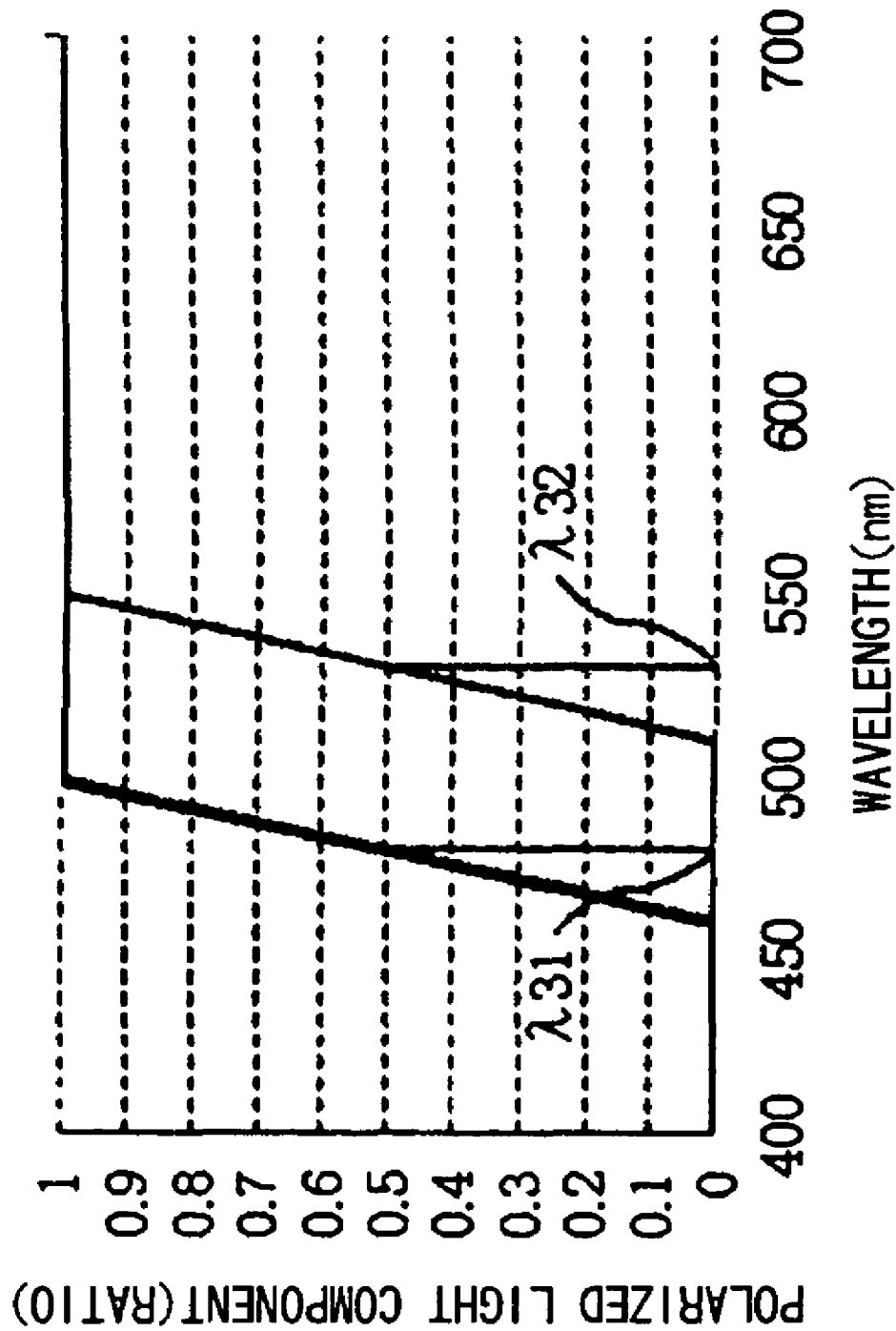
FIG. 8 is a view showing the characteristics of a color-selective wave plate according to Embodiment 3.

FIG. 7 shows the characteristics of the dichroic mirror 36 for a P-polarized light component according to the present embodiment with thick lines. FIG. 8 shows the characteristics of the first color-selective wave plate 38*a* with thick lines and shows the second color-selective wave plate 38*b* with thin lines. The characteristics of the color filter are the same as those in Embodiment 1.

In FIG. 6, the light component which was P-polarized light in the polarization converting element 34 also is P-polarized light (|) with respect to the dichroic mirror 36.

Therefore, in the light path of G, the light component of G transmitted through the dichroic mirror 6 has its polarization direction rotated by 90 degrees by the ½ wave plate 31, and is made incident into the first polarization beam splitter 10*b* as S-polarized light (•). And then, the light component of G is reflected by the polarization splitting surface 101*a* of the first polarization beam splitter 10*a* and reaches to the reflection type liquid crystal display element 11*g* for G. By the reflection type liquid crystal display element 11*g* for G, the light component of G is image-modulated and reflected. The S-polarized light component (•) of the image-modulated reflection light component of G is reflected again by the polarization splitting surface 101*a* of the first polarization beam splitter 10*a*, is returned to the light source side and eliminated from projection light. The P-polarized light component (|) of the image-modulated reflection light component of G is transmitted through the polarization splitting surface 101*a* of the first polarization beam splitter 10*a* and is made into projection light. The light component of G (|) transmitted through the first polarization beam splitter 10*a* is transmitted through the polarization splitting surface 101*c* of the third polarization beam splitter 10*c* and reaches the projection lens 13.

The light components of R and B which are reflected by the dichroic mirror 36 are made incident into the color filter 7 and a light component in the wavelength region between B and R is reflected. The light components of R and B whose colors have been thus adjusted are made incident into the first color-selective wave plate 38*a*. The first color-selective wave plate has an action of rotating the polarization direction of only the light component of R by 90 degrees, wherein the light component of B is made incident into the second polarization beam splitter 10*b* as P-polarized light component (|) and the light component of R is made incident thereinto as S-polarized light component (•). Accordingly, in the second polarization beam splitter 10*b*, the light component of B is transmitted through the polarization splitting surface 101*b* and reaches the reflection type liquid crystal display element 11*b* for B, and the light component of R is reflected by the polarization splitting surface 101*b* of the second polarization beam splitter 10*b* and reaches the reflection type liquid crystal display element 11*r* for R.

By the reflection type liquid crystal display element 11b for B, the light component of B is image-modulated and reflected. The P-polarized light component (|) of the image-modulated reflection light component of B is transmitted again through the polarization splitting surface 101b of the second polarization beam splitter 10b, is returned to the light source side and eliminated from projection light. The S-polarized light component (•) of the image-modulated reflection light component of B is reflected by the polarization splitting surface 101b of the second polarization beam splitter 10b and is made into projection light. Similarly, by the reflection type liquid crystal element 11r for R, the light component of R is image-modulated and reflected. The S-polarized light component (•) of the image-modulated reflection light component of R is reflected again by the polarization splitting surface of the second polarization beam splitter 10b, is returned to the light source side and eliminated from projection light. The P-polarized light component (|) of the image-modulated reflection light component of R is transmitted through the polarization splitting surface 101b of the second polarization beam splitter 10b and is made into projection light. Therefore, the projection light components of B and R are combined to become a single light flux.

The combined projection light components of R and B are made incident into the second color-selective wave plate 38b. The second color-selective wave plate 38b rotates only the polarization direction of the light component of R by 90 degrees, and the light components of R and B are made incident into the third polarization beam splitter 10c as S-polarized light component (•) and are reflected by the polarization splitting surface 101c of the third polarization beam splitter 10c, where the light components of R and B are combined with the projection light G.

The combined projection light components of R, G and B are projected onto a screen by the projection lens 13.

Herein, where 50% wavelength λ31 of the first color-selective wave plate 38a is compared with 50% wavelength λ32 of the second color-selective wave plate 38b, these are set so as to satisfy:

$\lambda 31 \ne \lambda 32$ and $\lambda 31 < \lambda 32$.

Thereby, a light component in the wavelength region between the two wavelengths λ31 and λ32 is made incident into the second polarization beam splitter 10b as S-polarized light.

(Embodiment 4)

Figure 9:
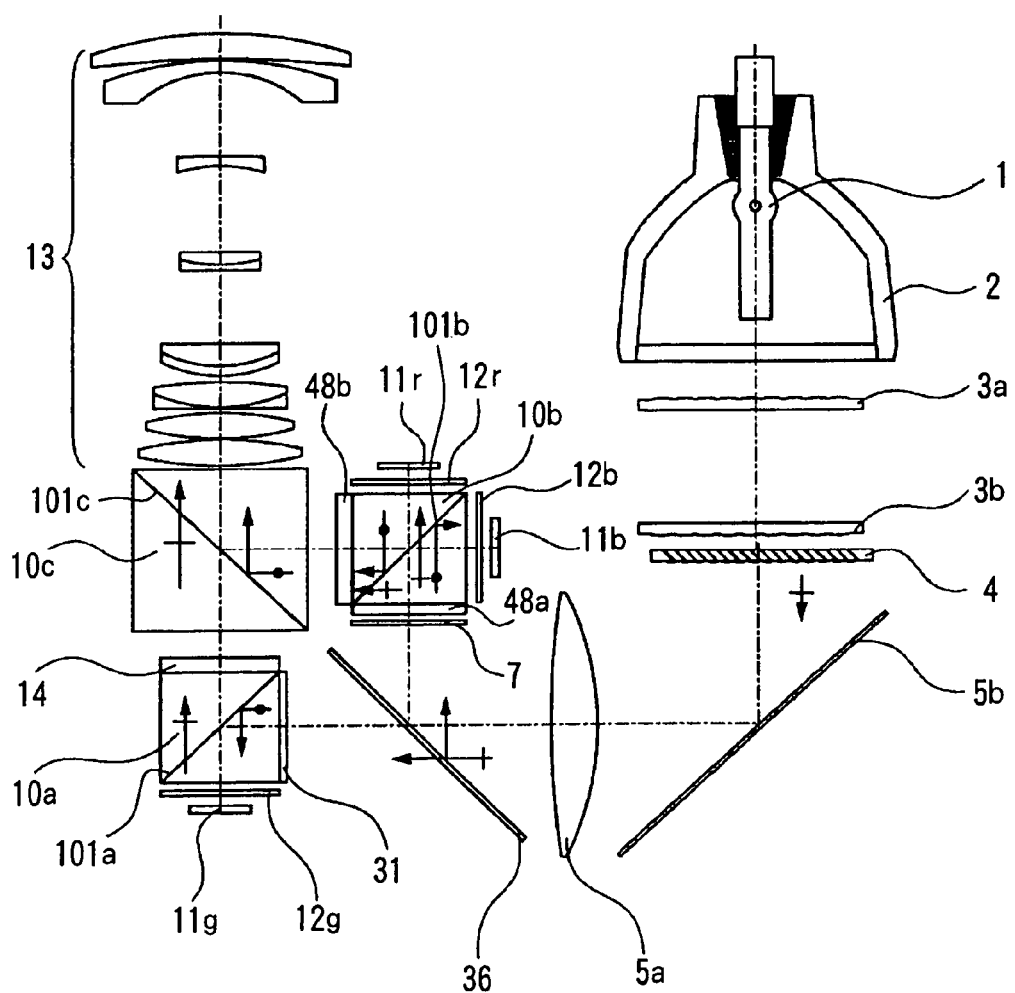
FIG. 9 is a view representing Embodiment 4 according to the present invention.

FIG. 9 is a view representing Embodiment 4 according to the present invention, wherein parts which are identical to those of Embodiment 3 are given the same Reference Numerals. A point in which Embodiment 4 differs from Embodiment 3 resides in that the arrangement of the reflection type liquid crystal display element for R and the reflection type liquid crystal display element for B is reversed. Therefore, Embodiment 4 is provided with a first color-selective wave plate 48a which converts the polarization direction of the light component of B by 90 degrees but does not convert the polarization direction of the light R, and a second color-selective wave plate 48b which converts the polarization direction of the light component of B by 90 degrees but does not convert the polarization direction of the light component of R.

Figure 10:
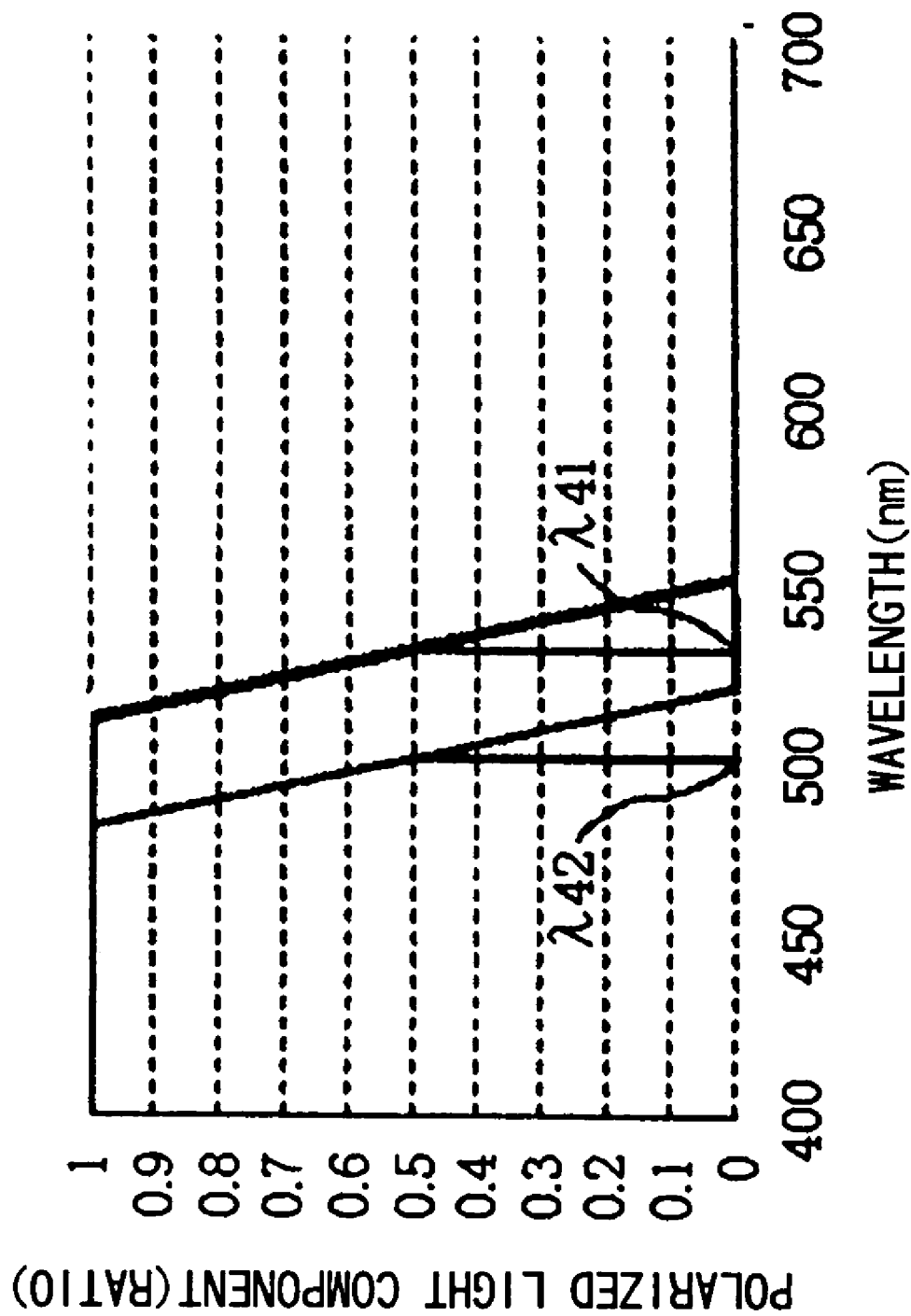
FIG. 10 is a view showing the characteristics of a color-selective wave plate of Embodiment 4.

FIG. 10 shows the characteristics of the first color-selective wave plate 48a according to the present embodiment with thick lines, and shows the characteristics of the second color-selective wave plate 48b with thin lines. The characteristics of the color filter are the same as those of Embodiment 1.

Thereby, the light components of R and B reflected by the dichroic mirror 36 are made incident into the first color-selective wave plate 48a after the colors thereof are adjusted by the color filter 7. The first color-selective wave plate 48a has an action of rotating the polarization direction of only the light component of B, whereby the light component of R is made incident into the second polarization beam splitter 10b as P-polarized light (|), and the light component of B is made incident thereinto as S-polarized light (•). Accordingly, in the second polarization beam splitter 10b, the light component of B is reflected by the polarization splitting surface 101b and reaches the reflection type liquid crystal display element 11b for B, and the light component of R is transmitted through the polarization splitting surface 101b and reaches the reflection type liquid crystal display element 11r for R.

By the reflection type liquid crystal display element 11b for B, the light component of B is image-modulated and reflected. The S-polarized light component (•) of the image-modulated reflection light component of B is reflected again by the polarization splitting surface 101b of the second polarization beam splitter 10b, is returned to the light source side and eliminated from projection light. The P-polarized light component (|) of the image-modulated reflection light component of B is reflected by the polarization splitting surface 101b of the second polarization beam splitter 10b and is made into projection light. Similarly, the light component of R is image-modulated and reflected by the reflection type liquid crystal display element 11r for R. The P-polarized light component (|) of the image-modulated reflection light component of R is transmitted again through the polarization splitting surface 101b of the second polarization beam splitter 10b, and almost all the P-polarized light component of R is returned to the light source side and eliminated from projection light. The S-polarized light component (•) of the image-modulated reflection light component of R is reflected by the polarization splitting surface 101b of the second polarization beam splitter 10b and is made into projection light, wherein projection light components of B and R are combined to be a single light flux.

The combined projection light components of R and B are made incident into the second color-selective wave plate 48b. The second color-selective wave plate 48b rotates only the polarization direction of the light component of B by 90 degrees, and the light components of R and B are made incident into the third polarization beam splitter 10c as S-polarized light (•), and are reflected by the polarization splitting surface 101c of the third polarization beam splitter 10c. These light components of R and B are combined with the projection light component of G. The combined projection light components of R, G and B are projected onto a screen, etc., by the projection lens 13.

Herein, where 50% wavelength λ41 of the first color-selective wave plate 48a is compared with 50% wavelength λ42 of the second color-selective wave plate 48b, these are set so as to satisfy:

$\lambda 41 \ne \lambda 42$ and $\lambda 41 > \lambda 42$.

Thereby, a light component in the wavelength region between the two wavelengths λ41 and λ42 is made incident into the second polarization beam splitter 10b as S-polarized light.

(Embodiment 5)

Figure 11:
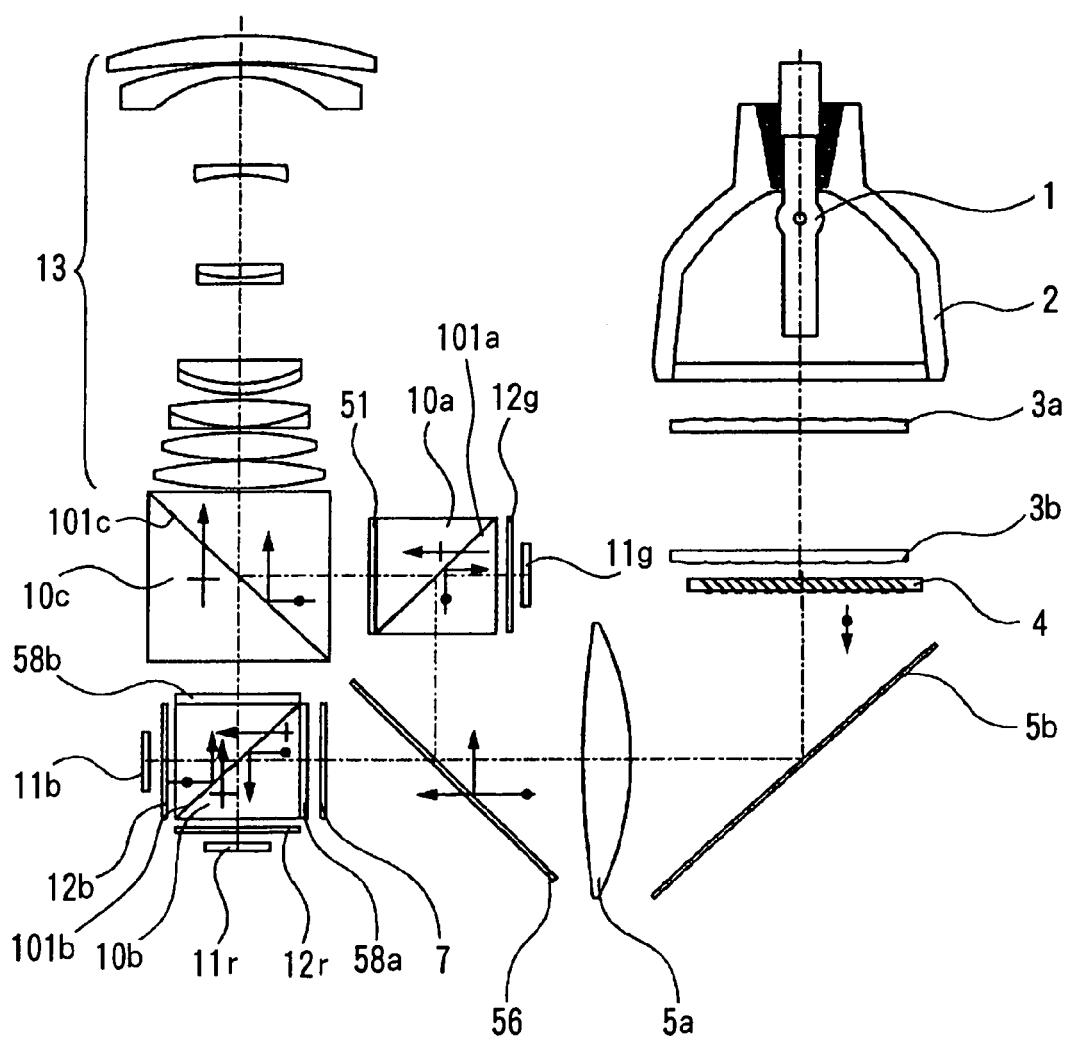
FIG. 11 is a view representing Embodiment 5 according to the present invention.

FIG. 11 is a view representing Embodiment 5 according to the present invention, wherein parts which are identical to those of Embodiment 1 are given the same Reference Numerals. Points in which Embodiment 5 differ from Embodiment 1 reside in that Embodiment 5 employs a dichroic mirror 56 having a characteristic by which the light component of G is reflected, and further, in that Embodiment 5 employs a first color-selective wave plate 58a which converts the polarization direction of the light component of B by 90 degrees but does not convert the polarization direction of the light component of R, a second color-wave plate 58b which converts the polarization direction of the light component of B by 90 degrees but does not convert the polarization direction of the light component of R, and a ½ wave plate 51.

Figure 12:
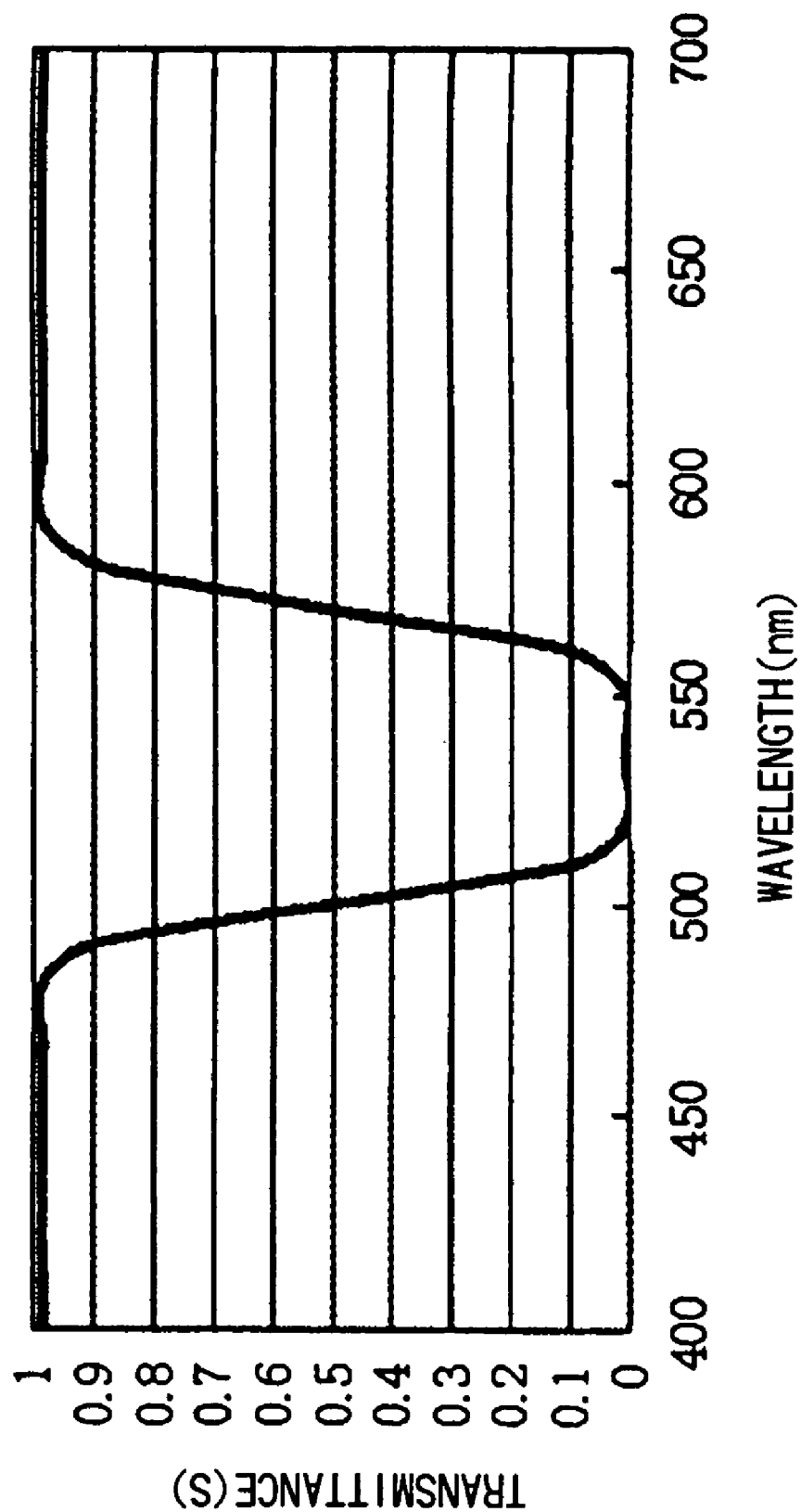
FIG. 12 is a view showing the characteristics of a dichroic mirror according to Embodiment 5.
Figure 13:
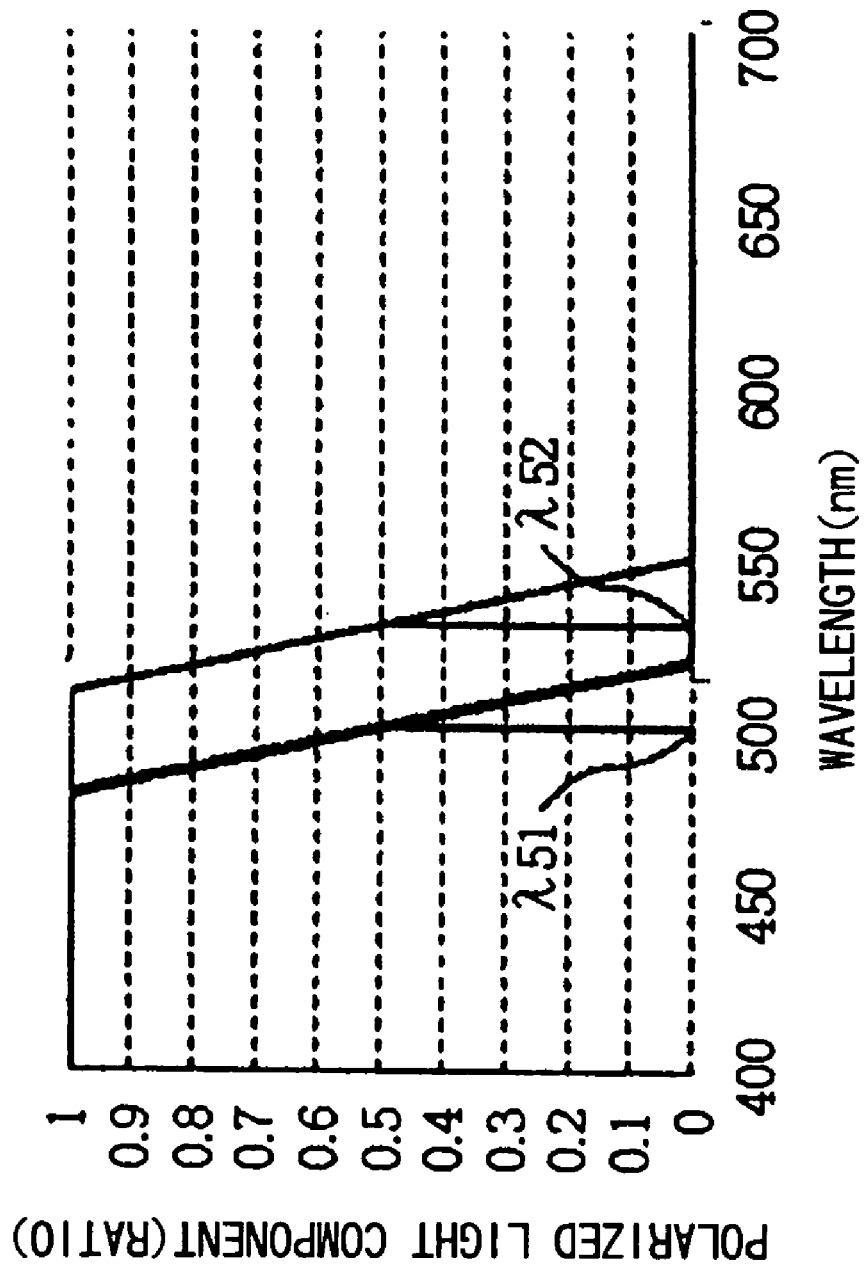
FIG. 13 is a view showing the characteristics of a color-selective wave plate according to Embodiment 5.

FIG. 12 shows the characteristics of the dichroic mirror 56 for the S-polarized light component according to the present embodiment with thick lines. FIG. 13 shows the characteristics of the first color-selective wave plate 58a with thick lines while FIG. 13 shows those of the second color-selective 58b wave plate with thin lines. The characteristics of the color filter 7 are identical to those of Embodiment 1.

In FIG. 11, the light component which was the S-polarized light in the polarization converting element 4 also is S-polarized light (•) with respect to the dichroic mirror 6.

In the optical channel of G, the light component of G reflected by the dichroic mirror 56 is made incident into the first polarization beam splitter 10a as S-polarized light (•), is reflected by the polarization splitting surface 101a of the first polarization beam splitter 10a, and reaches the reflection type liquid crystal display element 11g for G. The light component of G is image-modulated and reflected by the reflection type liquid crystal display element 11g for G. The S-polarized light component (•) of the image-modulated reflection light G is reflected again by the polarization splitting surface 101a of the first polarization beam splitter 10a, and almost all the S-polarized light component of G is returned to the light source side and is eliminated from projection light. The P-polarized light component (∣) of the image-modulated reflection light component of G is transmitted through the polarization splitting surface 101a of the first polarization beam splitter 10a and is made into projection light. The polarization direction of the light (∣) transmitted through the first polarization beam splitter 10a is rotated by 90 degrees by the ½ wave plate 51, and the light component (∣) is reflected by the polarization splitting surface 101c of the third polarization beam splitter 10c, and reaches the projection lens 13.

The light components of R and B transmitted through the dichroic mirror are made incident into the color filter 7, and a light component having the colors in the wavelength region between B and R is reflected. The light components of R and B whose colors have been thus adjusted are made incident into the first color-selective wave plate 58a. The first color-selective wave plate has an action of rotating the polarization direction of only the light component of B by 90 degrees, wherein the light component of B is made incident into the second polarization beam splitter 10b as P-polarized light (∣) and the light component of R is made incident thereinto as S-polarized light (•). Therefore, in the second polarization beam splitter 10b, the light component of B is transmitted through the polarization splitting surface 101b and reaches the reflection type liquid crystal display element 11b for B. The light component of R is reflected by the polarization splitting surface 101b and reaches the reflection type liquid crystal display element 11r for R.

By the reflection type liquid crystal display element 11b for B, the light component of B is image-modulated and reflected. The P-polarized light component (∣) of the image-modulated reflection light component of B is transmitted again through the polarization splitting surface 101b of the second polarization beam splitter 10b, and almost all the P-polarized light component of B is returned to the light source side and is eliminated from projection light. The S-polarized light component (•) of the image-modulated reflection light component of B is reflected by the polarization splitting surface 101b of the second polarization beam splitter 10b and is made into projection light. Similarly, by the reflection type liquid crystal display element 11r for R, the light component of R is image-modulated and reflected. The S-polarized light component (•) of the image-modulated reflection light component of R is reflected again by the polarization splitting surface 101b of the second polarization beam splitter 10b. Almost all the S-polarized light component is returned to the light source side and is eliminated from projection light. The P-polarized light component (∣) of the image-modulated reflection light component of R is transmitted through the polarization splitting surface 101b of the second polarization beam splitter 10b and is made into projection light, wherein the projection light components of B and R are made into a single light flux.

The combined projection lights R and B are made incident into the second color-selective wave plate 58b. The second color-selective wave plate 58b rotates only the polarization direction of the light component of B by 90 degrees, wherein the light components of R and B are made incident into the third polarization beam splitter 10c as P-polarized light (∣), and are transmitted through the polarization splitting surface 101c of the third polarization beam splitter 10c, wherein the light components of R and B are combined with the projection light G.

The combined projection light components of R, G and B are projected onto a screen, etc., by the projection lens 13.

Herein, where 50% wavelength λ51 of the first color-selective wave plate 58a is compared with 50% wavelength λ52 of the second color-selective wave plate 58b, these are set so as to satisfy:

$$\lambda 51 \neq \lambda 52$$

and $$\lambda 51 < \lambda 52.$$

Thereby, a light component in the wavelength region between the two wavelengths λ51 and λ52 is made incident into the second polarization beam splitter 10b as S-polarized light.

(Embodiment 6)

Figure 14:
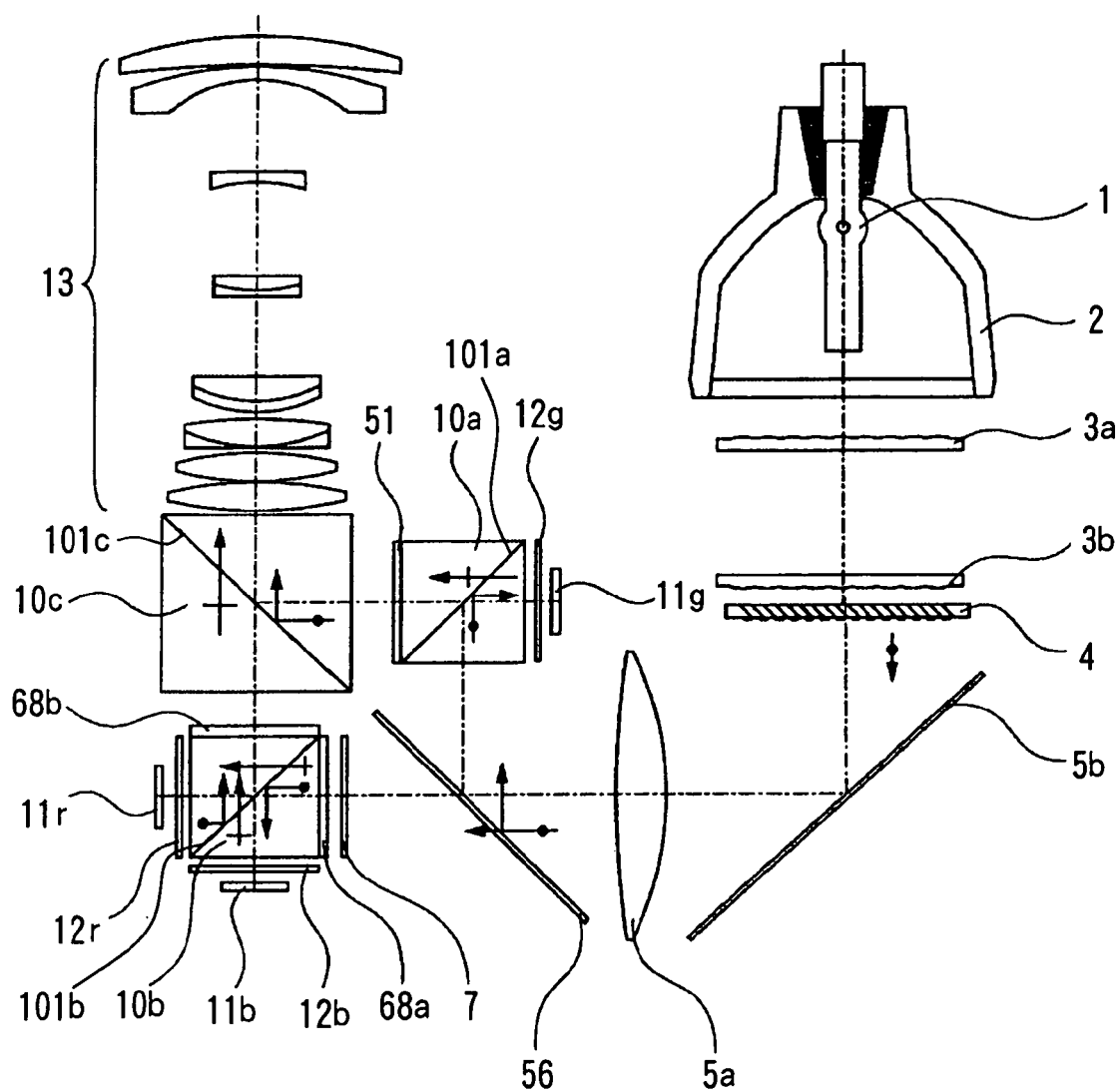
FIG. 14 is a view representing Embodiment 6 according to the present invention.

FIG. 14 is a view representing Embodiment 6, wherein parts which are identical to those of Embodiment 5 are given the same Reference Numerals. A point in which Embodiment 6 differs from Embodiment 5 resides in that the arrangement of the reflection type liquid crystal display element for R and the reflection type liquid crystal display element for B is reversed. Therefore, Embodiment 6 is provided with a first color-selective wave plate 68a which converts the polarization direction of the light component of R by 90 degrees but does not convert the polarization direction of the light component of B and a second color-selective wave plate 68b which converts the polarization direction of the light component of R by 90 degrees but does not convert the polarization direction of the light component of B.

Figure 15:
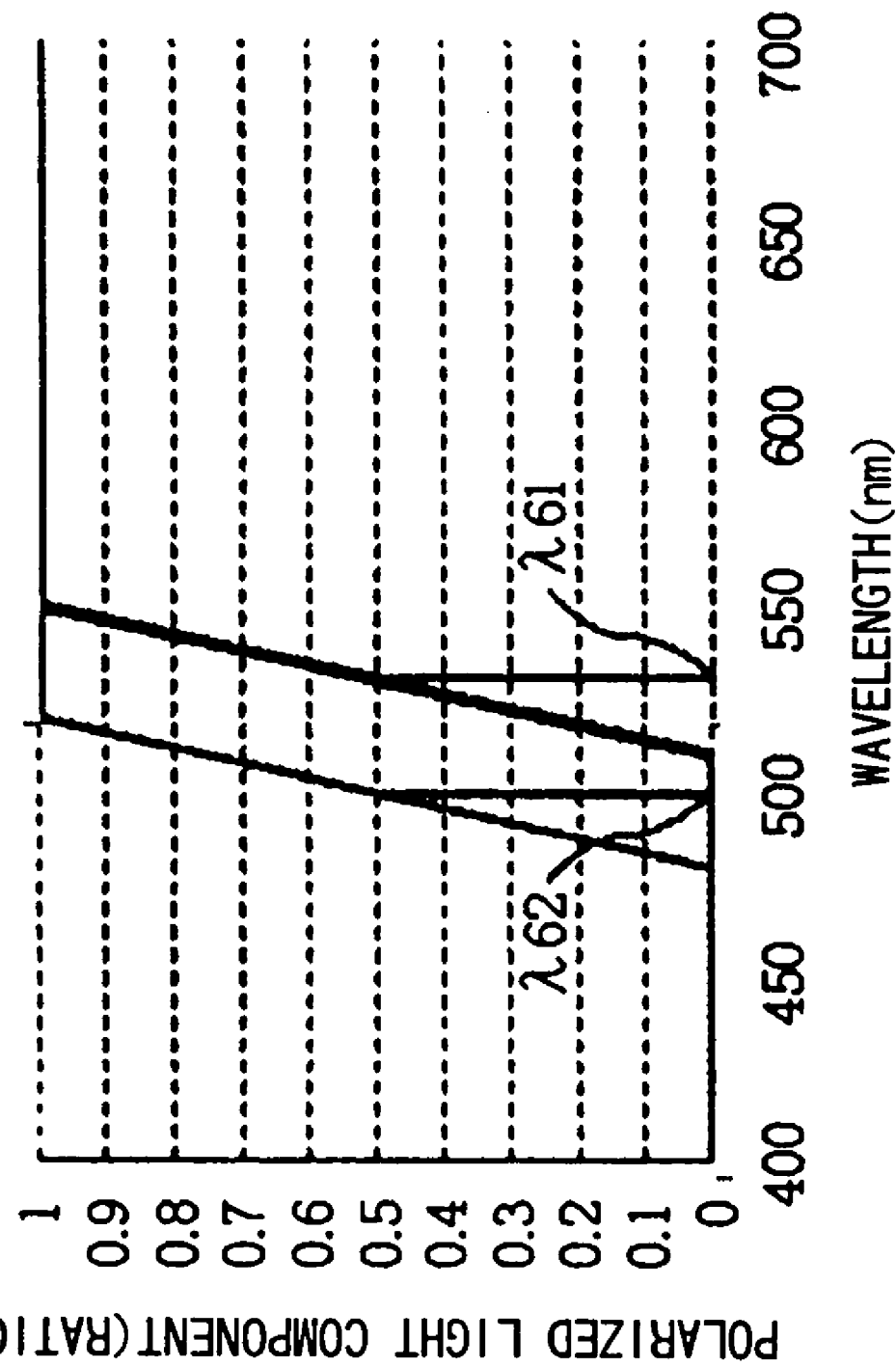
FIG. 15 is a view showing the characteristics of a color-selective wave plate according to Embodiment 6.

FIG. 15 shows the characteristics of the first color-selective wave plate 68a according to the Embodiment with thick lines, and shows the characteristics of the second color-selective wave plate 68b with thin lines.

Thereby, the light components of R and B transmitted through the dichroic mirror 56 are made incident into the color filter 7, and a light component having colors in the wavelength region between B and R are reflected. The light components of R and B whose colors have been thus adjusted are made incident into the first color-selective wave plate 68a. The first color-selective wave plate 68a has an action of rotating the polarization direction of only the light component of R by 90 degrees. The light component of R is made incident into the second polarization beam splitter 10b as P-polarized light (l), and the light component of B is made incident thereinto as S-polarized light (•) Accordingly, in the second polarization beam splitter 10b, the light component of B is reflected by the polarization splitting surface 101b and reaches the reflection type liquid crystal display element 11b for B, and the light component of R is transmitted through the polarization splitting surface 101b and reaches the reflection type liquid crystal display element 11r for R.

The light component of B is image-modulated and reflected by the reflection type liquid crystal display element 11b for B. The S-polarized light component (•) of the image-modulated reflection light component of B is reflected again by the polarization splitting surface 101b of the second polarization beam splitter 10b. Almost all the S-polarized light component of B is returned to the light source side and is eliminated from projection light. The P-polarized light component (l) of the image-modulated reflection light component of B is transmitted through the polarization splitting surface 101b of the second polarization beam splitter 10b. Similarly, the light component of R is image-modulated and reflected by the reflection type liquid crystal display element 11r for R. The P-polarized light component (l) of the image-modulated reflection light component of R is transmitted again through the polarization splitting surface 101b of the second polarization beam splitter 10b. Almost all the P-polarized light component of R is returned to the light source side and is eliminated from projection light. The S-polarized light component (•) of the image-modulated reflection light component of R is reflected by the polarization splitting surface 101b of the second polarization beam splitter 10b and is made into projection light, wherein the light components of B and R are combined to be a single light flux.

The combined projection light components of R and B are made incident into the second color-selective wave plate 68b. The second color-selective wave plate 68b rotates the polarization direction of only the light component of R, and the light components of R and B are made incident into the third polarization beam splitter 10c as the P-polarized light (l), and is transmitted through the polarization splitting surface 101c of the third polarization beam splitter 10c, wherein the light components of R and B are combined with the projection light G.

The combined projection light components of R, G and B are projected onto a screen, etc., by the projection lens 13.

Herein, where 50% wavelength λ61 of the first color-selective wave plate 68a is compared with 50% wavelength λ62 of the second color-selective wave plate 68b, these are set so as to satisfy:

$$\lambda 61 \neq \lambda 62$$

and $$\lambda 61 > \lambda 62.$$

Thereby, a light component in the wavelength region between the two wavelengths λ61 and λ62 is made incident into the second polarization beam splitter 10b as S-polarized light.

(Embodiment 7)

Figure 16:
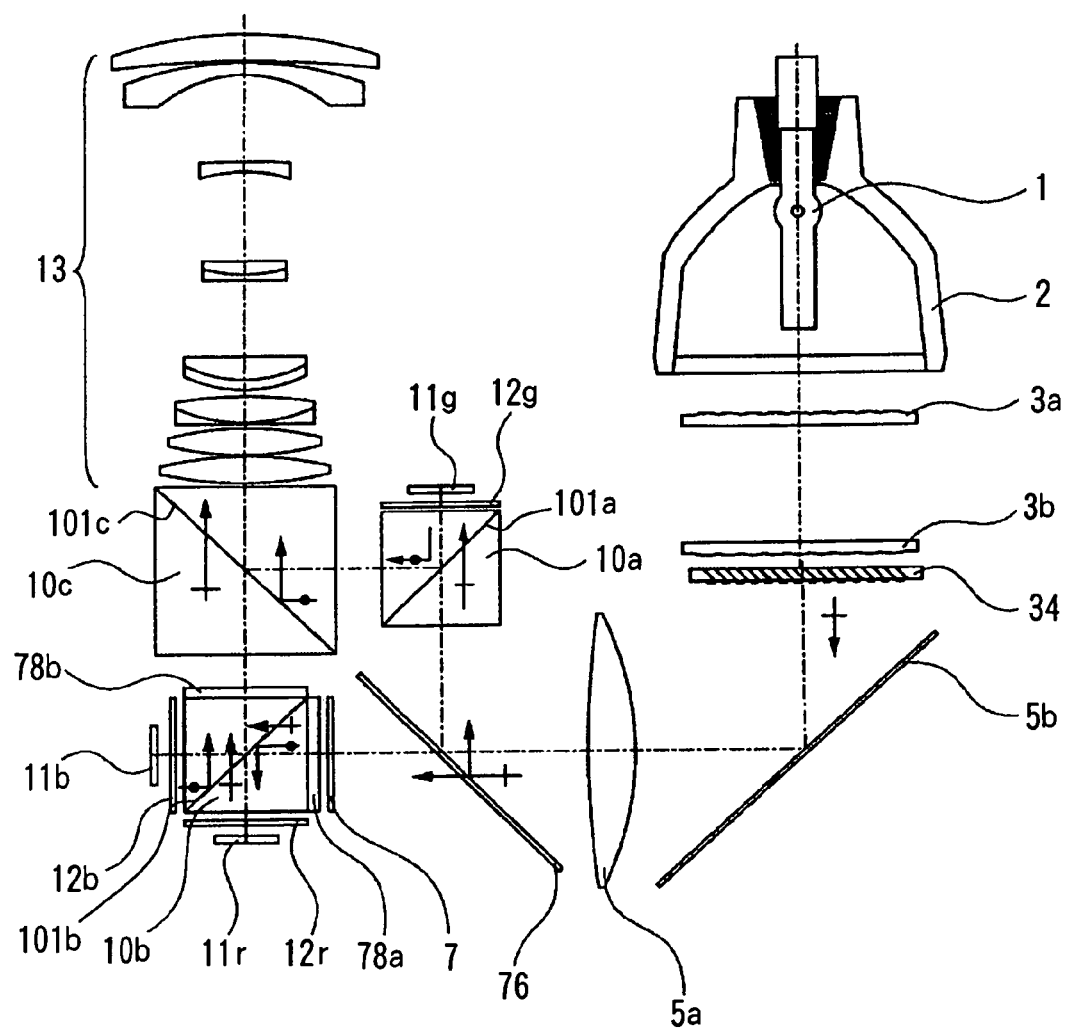
FIG. 16 is a view representing Embodiment 7 according to the invention.

FIG. 16 is a view representing Embodiment 7 according to the present invention, wherein parts which are identical to those of Embodiment 5 are given the same Reference Numerals. A point in which Embodiment 7 differs from Embodiment 5 resides in that Embodiment 7 is provided with a polarization converting element 34 by which non-polarized light is aligned to be P-polarized light. Therefore, a first color-selective wave plate 78a which converts the polarization direction of the light component of R by 90 degrees but does not convert the polarization direction of the light component of B and the second color-selective wave plate 78b which converts the polarization direction of the light component of B by 90 degrees but does not convert the polarization direction of the light component of R are provided therein, and a dichroic mirror 76 which splits P-polarized light into a light component of a predetermined wavelength is provided therein.

Figure 17:
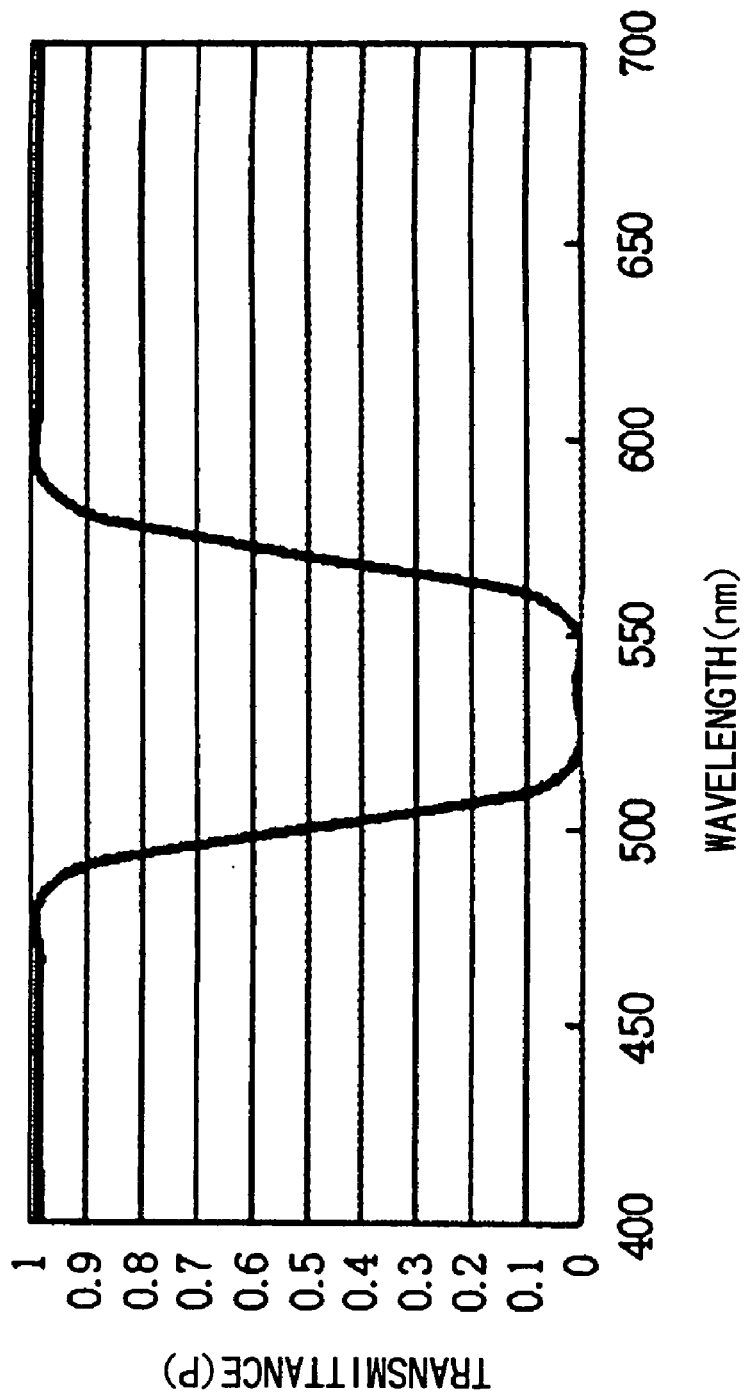
FIG. 17 is a view showing the characteristics of a dichroic mirror according to Embodiment 7.
Figure 18:
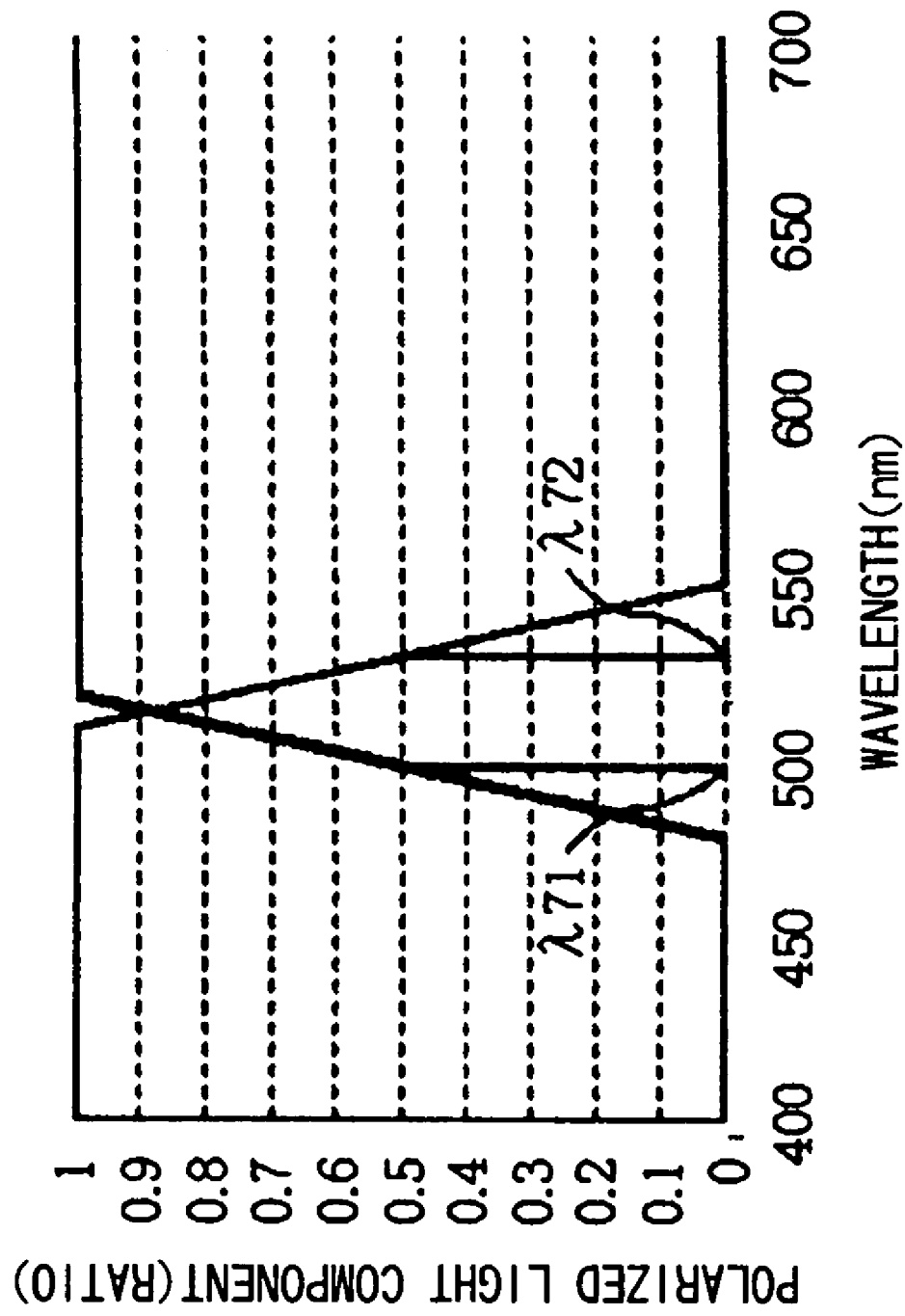
FIG. 18 is a view showing the characteristics of a color-selective wave plate according to Embodiment 7.

FIG. 17 shows the characteristics of the dichroic mirror 76 for the P-polarized light component according to the present embodiment with thick lines, and FIG. 18 shows the characteristics of the first color-selective wave plate 78a with thick lines. Further, the second color-selective wave plate 78b is shown with thin lines in FIG. 18.

In FIG. 16, the light which was the P-polarized light in the polarization converting element 34 also is P-polarized light (l) with respect to the dichroic mirror 76.

Thereby, in the optical channel of G, the light component of G reflected by the dichroic mirror 76 is made incident into the first polarization beam splitter 10a as P-polarized light (l), is transmitted through the polarization splitting surface 101a of the first polarization beam splitter 10a and reaches the reflection type liquid crystal display element 11g for G. The light component of G is image-modulated and reflected by the reflection type liquid crystal display element 11g for G. The P-polarized light component (l) of the image-modulated reflection light component of G is transmitted again through the polarization splitting surface 101a of the first polarization beam splitter 10a. Almost all the P-polarized light component of G is returned to the light source side and is eliminated from projection light. The S-polarized light component (•) of the image-modulated reflection light component of G is reflected by the polarization splitting surface 101a of the first polarization beam splitter 10a and is made into projection light. The light component (•) reflected by the first polarization beam splitter 10a is reflected by the polarization splitting surface 101c of the third polarization beam splitter 10c and reaches the projection lens 13.

The light components of R and B transmitted through the dichroic mirror are made incident into the color filter 7 and a color light component in the wavelength region between B and R is reflected. The light components of R and B whose colors have been thus adjusted are made incident into the first color-selective wave plate 78a. The first color-selective wave plate has an action of rotating the polarization direction of only the light component of R by 90 degrees, whereby the light component of B is made incident into the second polarization beam splitter 10b as P-polarized light (|) and the light component of R is made incident thereinto as the S-polarized light (•). Accordingly, in the second polarization beam splitter 10b, the light component of B is transmitted through the polarization splitting surface 101b and reaches the reflection type liquid crystal display element 11b for B, and the light component of R is reflected by the polarization splitting surface 101b and reaches the reflection type liquid crystal display element 11r for R.

By the reflection type liquid crystal display element 11b for B, the light component of B is image-modulated and reflected. The P-polarized component (|) of the image-modulated reflection light component of B is transmitted again through the polarization splitting surface 101b of the second polarization beam splitter 10b. Almost all the P-polarized light component of B is returned to the light source side, and is eliminated from projection light. The S-polarized light component (•) of the image-modulated reflection light component of B is reflected by the polarization splitting surface 101b of the second polarization beam splitter 10b and is made into projection light. Similarly, the light component of R is image-modulated and reflected by the reflection type liquid crystal display element 11r for R. The S-polarized component (•) of the image-modulated reflection light component of R is reflected again by the polarization splitting surface 101b of the second polarization beam splitter 10b. Almost all the S-polarized light component of R is returned to the light source side, and is eliminated from projection light. The P-polarized light component (|) of the image-modulated reflection light component of R is transmitted through the polarization splitting surface 101b of the second polarization beam splitter 10b, wherein the projection light components of B and R are combined to be a single light flux.

The combined projection light components of R and B are made incident into the second color-selective wave plate 78b. The second color-selective wave plate 78b rotates the polarization direction of only the light component of B, wherein the light components of R and B are made incident into the third polarization beam splitter 10c as P-polarized light component (|), and are transmitted through the polarization splitting surface 101c of the third polarization beam splitter 10c, wherein the light components of R and B are combined with the projection light G.

The combined projection light components of R, G and B are projected onto a screen, etc., by the projection lens 13.

Herein, where 50% wavelength $\lambda 71$ of the first color-selective wave plate 78a is compared with 50% wavelength $\lambda 72$ of the second color-selective wave plate 78b, these are set so as to satisfy:

$$\lambda 71 \neq \lambda 72$$

and $$\lambda 71 < \lambda 72.$$

Thereby, a light component in the wavelength region between the two wavelengths $\lambda 71$ and $\lambda 72$ is made incident into the second polarization beam splitter 10b as S-polarized light.

(Embodiment 8)

Figure 19:
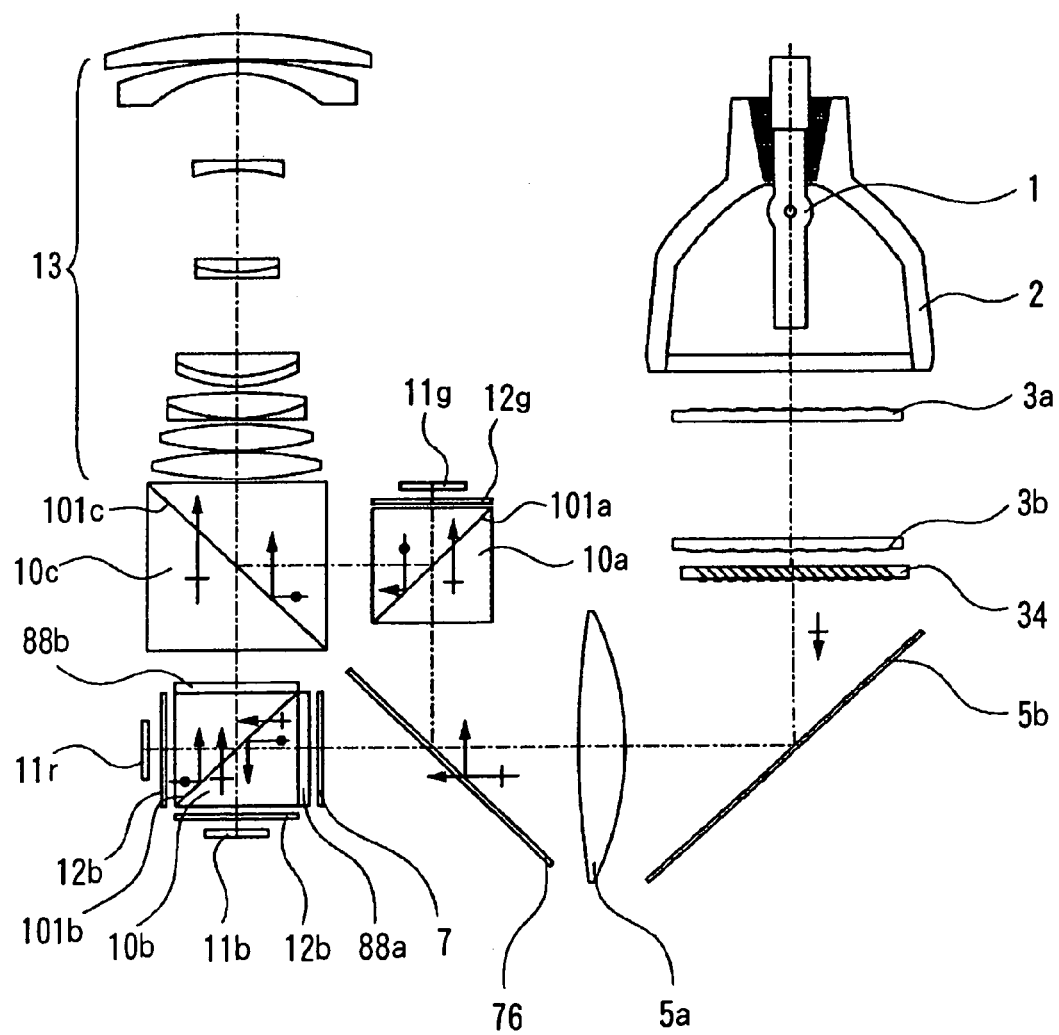
FIG. 19 is a view representing Embodiment 8 according the present invention.

FIG. 19 is a view representing Embodiment 8 according to the present invention, wherein parts which are identical to those of Embodiment 7 are given the same Reference Numerals. A point in which Embodiment 8 differs from Embodiment 7 resides in that the arrangement of the reflection type liquid crystal display element for R and the reflection type liquid crystal display element for B is reversed. Therefore, Embodiment 8 is provided with a first color-selective wave plate 88a which converts the polarization direction of the light component of B by 90 degrees but does not convert the polarization direction of the light component of R and a second color-selective wave plate 88b which converts the polarization direction of the light component of R by 90 degrees but does not convert the polarization direction of the light component of B.

Figure 20:
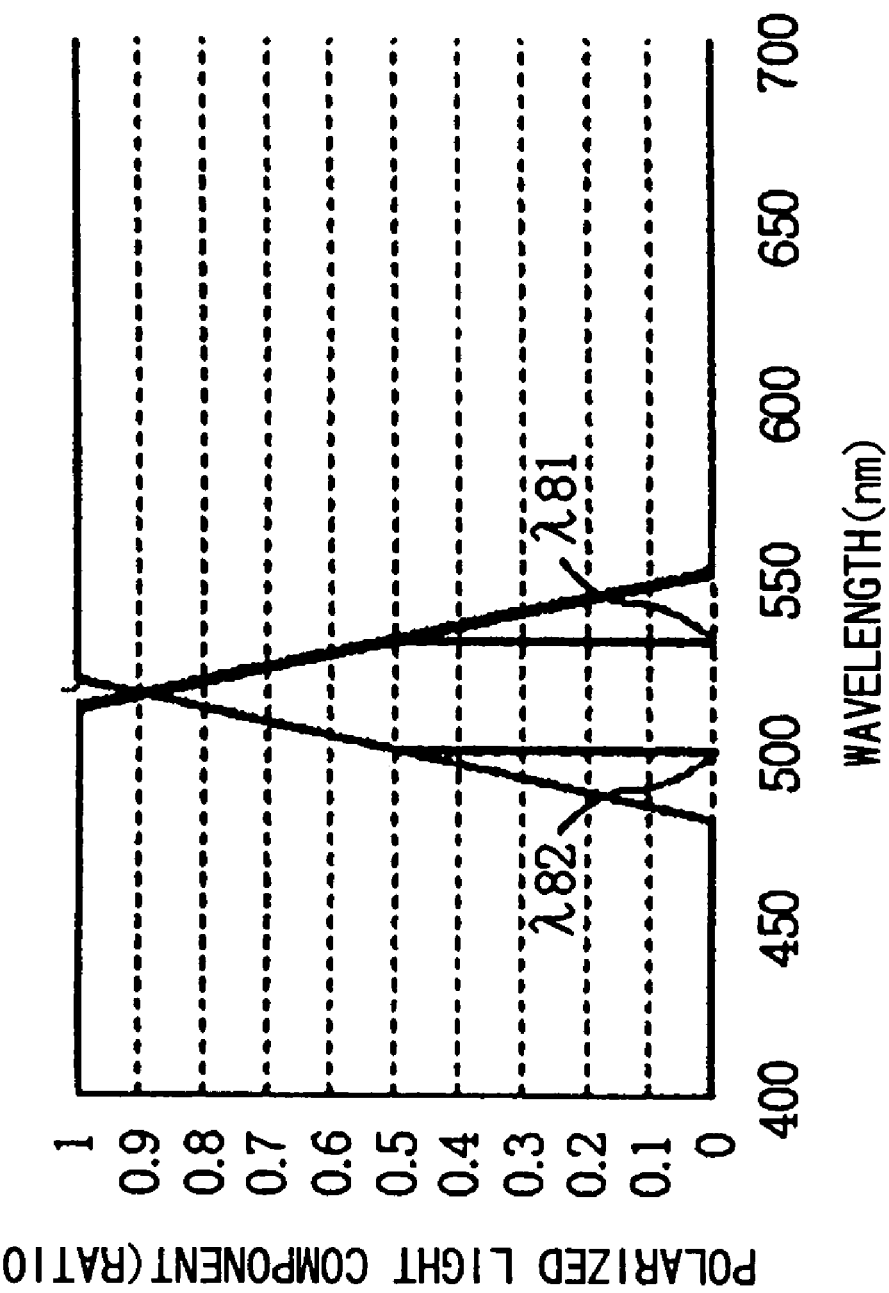
FIG. 20 is a view showing the characteristics of a color-selective wave plate according to Embodiment 8.

FIG. 20 shows the characteristics of the first color-selective wave plate 88a according to the present embodiment with thick lines, and shows the characteristics of the second color-selective wave plate 88b with thin lines.

Thereby, the light components of R and B transmitted through the dichroic mirror 76 are made incident into the color filter 7, and a color light component in the wavelength region between B and R is reflected. The light components of R and B whose color has been thus adjusted are made incident into the first color-selective wave plate 88a. The first color-selective wave plate has an action of rotating the polarization direction of only the light component of B by 90 degrees, wherein the light component of R is made incident into the second polarization beam splitter 10b as P-polarized light (|) while the light component of B is made incident thereinto as S-polarized light (•). Therefore, in the second polarization beam splitter 10b, the light component of B is reflected by the polarization splitting surface 101b and reaches the reflection type liquid crystal display element 11b for B while the light component of R is transmitted through the polarization splitting surface 101b and reaches the reflection type liquid crystal display element 11r for R.

The light component of B is image-modulated and reflected by the reflection type liquid crystal display element 11b for B. The S-polarized light component (•) of the image-modulated reflection light component of B is reflected again by the polarization splitting surface 101b of the second polarization beam splitter 10b. Almost all the S-polarized light component of B is returned to the light source side, and is eliminated from projection light. The P-polarized light component (|) of the image-modulated reflection light component of B is transmitted through the polarization splitting surface 101b of the second polarization beam splitter 10b and is made into projection light. Similarly, the light component of R is image-modulated and reflected by the reflection type liquid crystal display element 11r for R. The P-polarized light component (|) of the image-modulated reflection light component of R is transmitted again through the polarization splitting surface 101b of the second polarization beam splitter 10b. Almost all the P-polarized light component of R is returned to the light source side and is eliminated from projection light. The S-polarized light component (•) of the image-modulated reflection light component of R is reflected by the polarization splitting surface 101b of the second polarization beam splitter 10b and is made into projection light, wherein the projection light components of B and R are combined to be a single light flux.

The combined projection light components of R and B are made incident into the second color-selective wave plate 88b. The second color-selective wave plate 88b rotates the polarization direction of only the light component of R by 90 degrees, and the light components of R and B are made incident into the third polarization beam splitter 10c as P-polarized light (∥), and are transmitted through the polarization splitting surface 101c of the third polarization beam splitter 10c, wherein the light components of R and B are combined with the projection light G.

The combined projection light components of R, G and B are projected onto a screen by the projection lens 13.

Herein, where 50% wavelength λ81 of the first color-selective wave plate 88a is compared with 50% wavelength λ82 of the second color-selective wave plate 88b, these are set so as to satisfy:

$$\lambda 81 \neq \lambda 82$$

and $$\lambda 81 > \lambda 82.$$

Thereby, a light component in the wavelength region between the two wavelengths λ81 and λ82 is made incident into the second polarization beam splitter 10b as S-polarized light.

(Embodiment 9)

Figure 21:
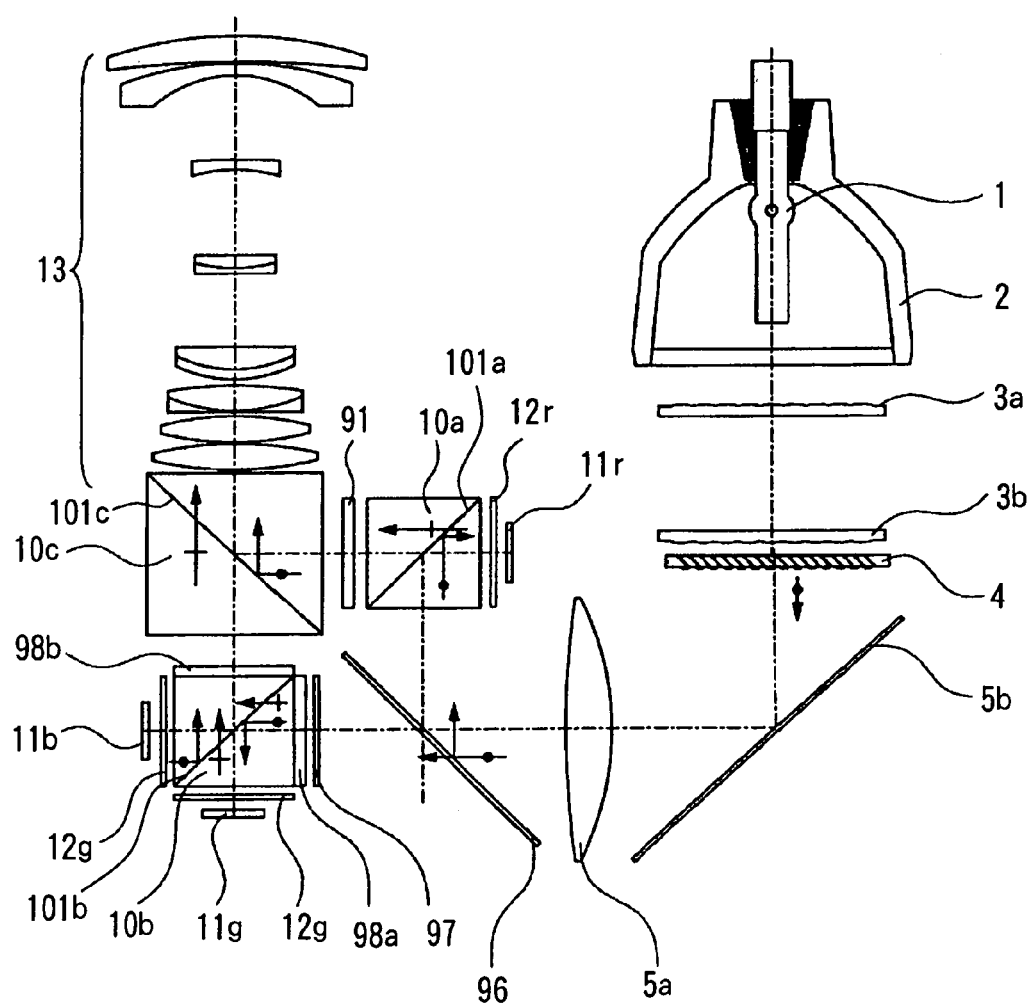
FIG. 21 is a view representing Embodiment 9 according to the present invention.

FIG. 21 is a view showing Embodiment 9 according to the present invention. In the drawing, parts which are identical to those in Embodiment 1 are given the same Reference Numerals. In the Embodiment, Reference Numeral 96 denotes a dichroic mirror as a color splitting member which transmits a light component in the wavelength region of blue (B) and green (G). Reference Numeral 97 denotes a color filter which cuts a part of a light component in the intermediate wavelength region between B and G. Reference Numeral 98a denotes the first color-selective wave plate which converts the polarization direction of the light component of B by 90 degrees but does not convert the polarization direction of the light component of G, and 98b denotes the second color-selective wave plate which converts the polarization direction of the light component of B by 90 degrees but does not convert the polarization direction of the light component of G. Reference Numeral 91 denotes a ½ wave plate.

Figure 22:
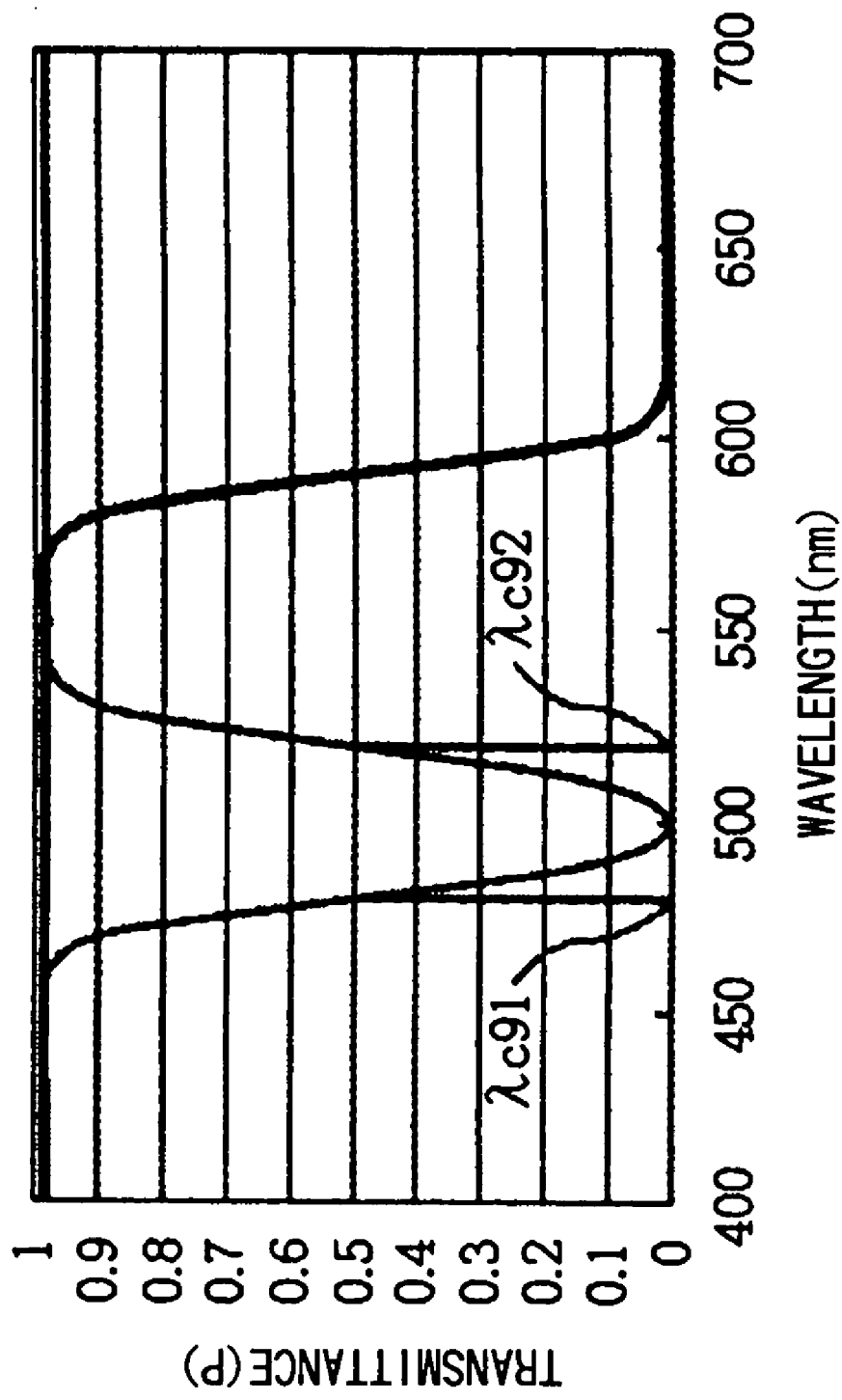
FIG. 22 is a view showing the characteristics of a dichroic mirror and a color filter according to Embodiment 9.
Figure 23:
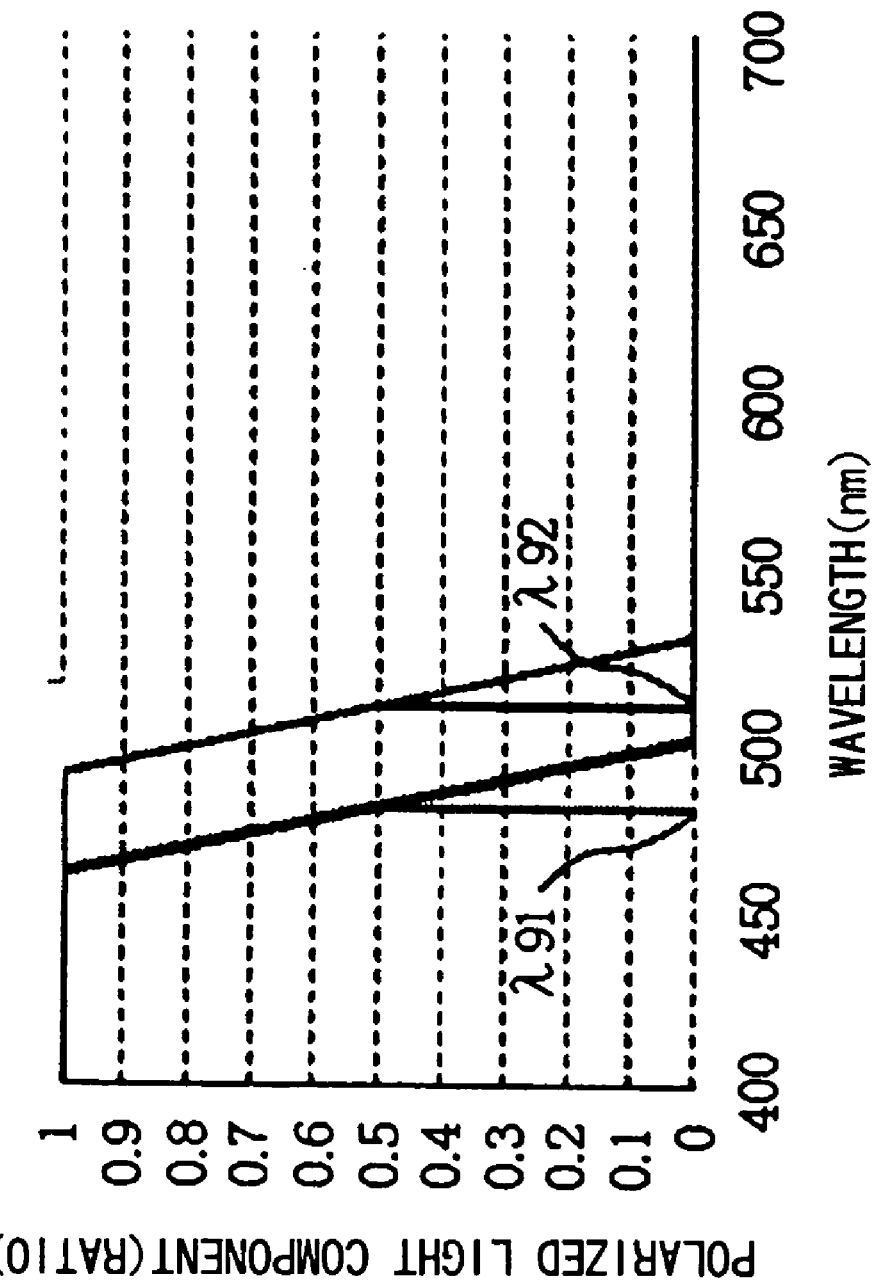
FIG. 23 is a view showing the characteristics of a color-selective wave plate according to Embodiment 9.

FIG. 22 shows the characteristics of the dichroic mirror 96 for an S-polarized light component with thick lines, and FIG. 22 shows the characteristics of the color filter 97 with thin lines, wherein the characteristics of the first color-selective wave plate 98a are shown with thick lines in FIG. 23 and those of the second color-selective wave plate 98b are shown with thin lines therein.

In FIG. 21, the light component which was S-polarized light in the polarization converting element 4 also is S-polarized light (•) with respect to the dichroic mirror 96.

In the optical path of R, the light component of R reflected by the dichroic mirror 96 is made incident into the first polarization beam splitter 10a as S-polarized light (•), reflected by the polarization splitting surface 101a of the first polarization beam splitter 10a, and reaches the reflection type liquid crystal display element 11r for R. By the reflection type liquid crystal display element 11r for R, the light component of R is image-modulated and reflected. The S-polarized light component (•) of the image-modulated reflection light component of R is reflected again by the polarization splitting surface 101a of the first polarization beam splitter 10a. Almost all the S-polarized light component of R is returned to the light source side and is eliminated from projection light. The P-polarized light component (∥) of the image-modulated reflection light component of R is transmitted through the polarization splitting surface 101a of the first polarization beam splitter 10a and is made into projection light. With respect to the P-polarized light component of R transmitted through the first polarization beam splitter 10a, the polarization direction thereof is rotated by 90 degrees by the first ½ wave plate 91, and is made incident into the third polarization beam splitter 10c as S-polarized light (•), reflected by the polarization splitting surface 101c of the third polarization beam splitter 10c, and reaches the projection lens 13.

With respect to the light components of G and B transmitted through the dichroic mirror 96, a color light component in the wavelength region between B and G is reflected by the color filter 97. The light components of G and B whose colors have been thus adjusted are made incident into the first color-selective wave plate 98a. The first color-selective wave plate 98a has an action of rotating the polarization direction of the light component of G by 90 degrees, whereby the light component of B is made incident into the second polarization beam splitter 10b as P-polarized light (∥) and the light component of G is made incident thereinto as S-polarized light (•).

By the reflection type liquid crystal display element 11b for light B, the light component of B is image-modulated and reflected. The P-polarized light component (∥) of the image-modulated reflection light component of B is transmitted again through the polarized splitting surface 101b of the second polarization beam splitter 10b. Almost P-polarized all the light component of B is returned to the light source side, and is eliminated from projection light. The S-polarized light component (•) of the image-modulated reflection light component of B is reflected by the polarization splitting surface 101b of the second polarization beam splitter 10b and is made into projection light. Similarly, the light component of G is image-modulated and reflected by the reflection type liquid crystal display element 11g for G. The S-polarized light component (•) of the image-modulated reflection light component of G is reflected again by the polarization splitting surface 101b of the second polarization beam splitter 10b. Almost all the S-polarized light component of G is returned to the light source side and is eliminated from projection light. The P-polarized light component (∥) of the image-modulated reflection light component of G is transmitted through the polarization splitting surface 101b of the second polarization beam splitter 10b and is made into projection light, whereby the projection light components of B and G are combined to be a single light flux.

The combined projection light components of G and B are made into the second color-selective wave plate 98b. The second color-selective wave plate 98b rotates the polarization direction of only the light component of B by 90 degrees. Both light components of G and B are made incident into the third polarization beam splitter 10c as P-polarized light (∥), and are transmitted through the polarization splitting surface 101c of the third polarization beam splitter 10c, wherein the light components of G and B are combined with the projection light R.

Herein, where 50% wavelength λ91 of the first color-selective wave plate 98a is compared with 50% wavelength λ92 of the second color-selective wave plate 98b, these are set so as to satisfy:

$$\lambda 91 \neq \lambda 92$$

and $$\lambda 91 < \lambda 92.$$

Thereby, a light component in the wavelength region between the two wavelengths λ91 and λ92 is made incident into the second polarization beam splitter 10b as S-polarized light.

Also, when that 50% wavelengths of the color filter 97 shown in FIG. 22 are λc91 and λc92, and λ90 is:

$$\lambda 90 = (\lambda 91 + \lambda 92)/2,$$

$$\lambda 91 < \lambda 90 < \lambda 92$$

will be obtained.

(Embodiment 10)

Figure 24:
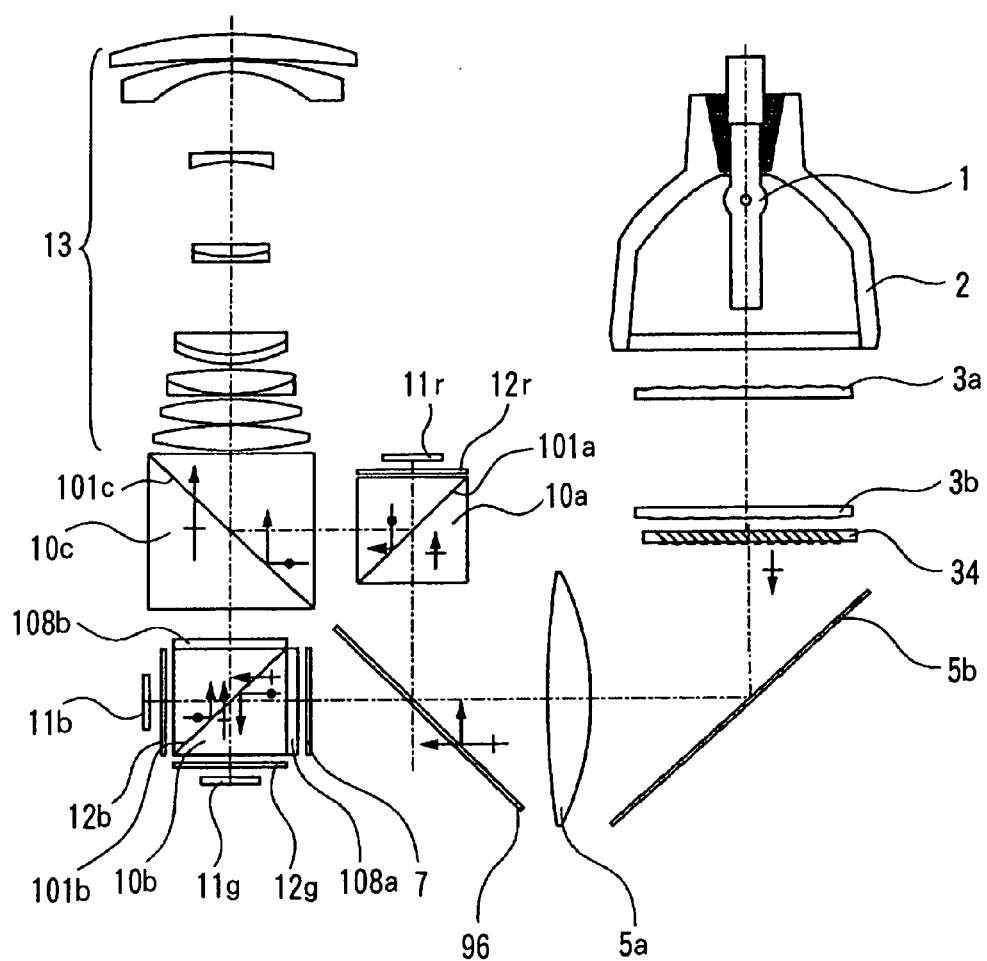
FIG. 24 is a view representing Embodiment 10 of the present invention.

FIG. 24 is a view representing Embodiment 10 according to the present invention, wherein parts which are identical to those in Embodiment 9 are given the same Reference Numerals. A point in which Embodiment 10 differs from Embodiment 9 resides in that Embodiment 10 is provided with a polarization converting element 34 by which non-polarized light is aligned to P-polarized light. Therefore, Embodiment 10 is provided with a first color-selective wave plate 108a which converts the polarization direction of the light component of G by 90 degrees but does not convert the polarization direction of the light component of B, and the second color-selective wave plate 108b which converts the polarization direction of light B by 90 degrees but does not convert the polarization direction of the light component of G are provided, and is further provided with a dichroic mirror 106 by which P-polarized light is split into light components having predetermined wavelengths.

Figure 25:
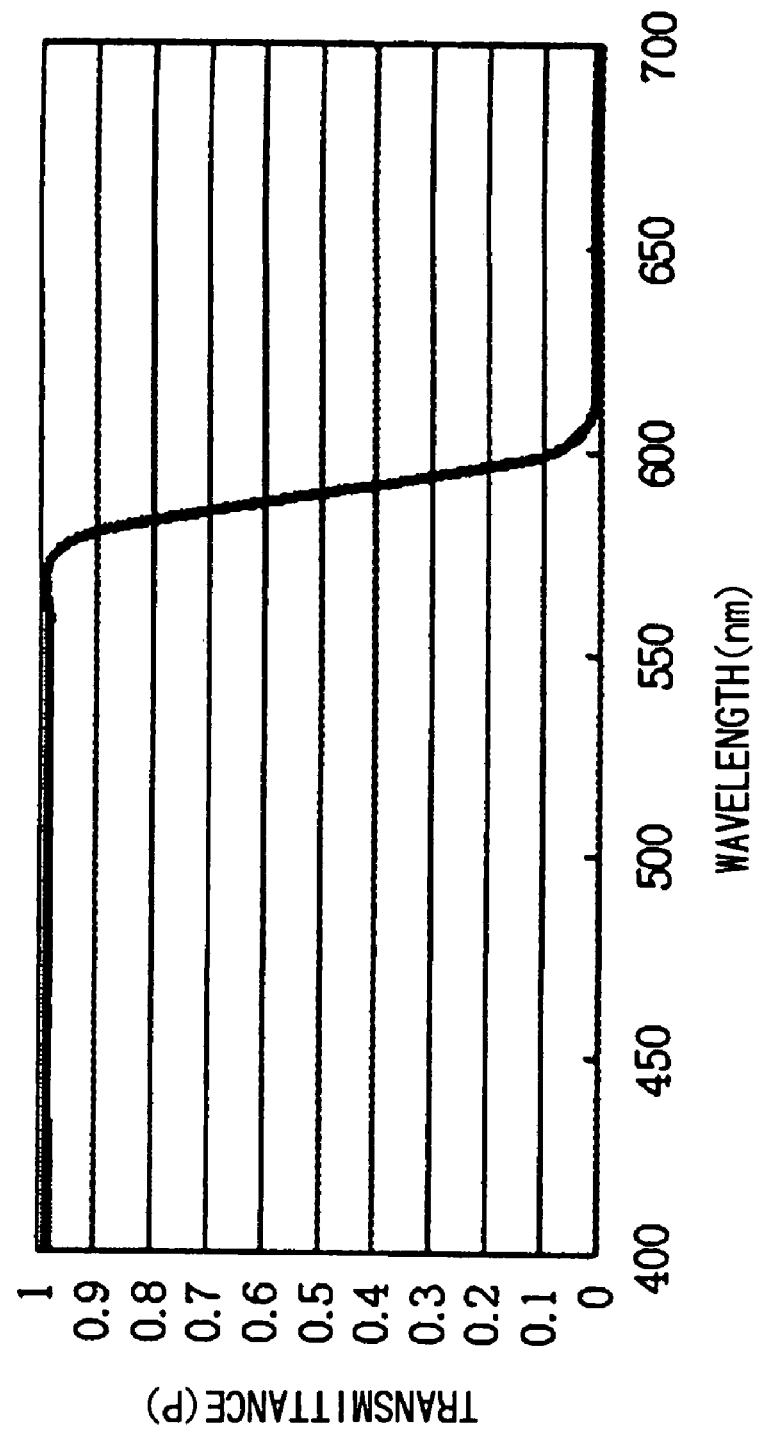
FIG. 25 is a view showing the characteristics of a dichroic mirror according to Embodiment 10.
Figure 26:
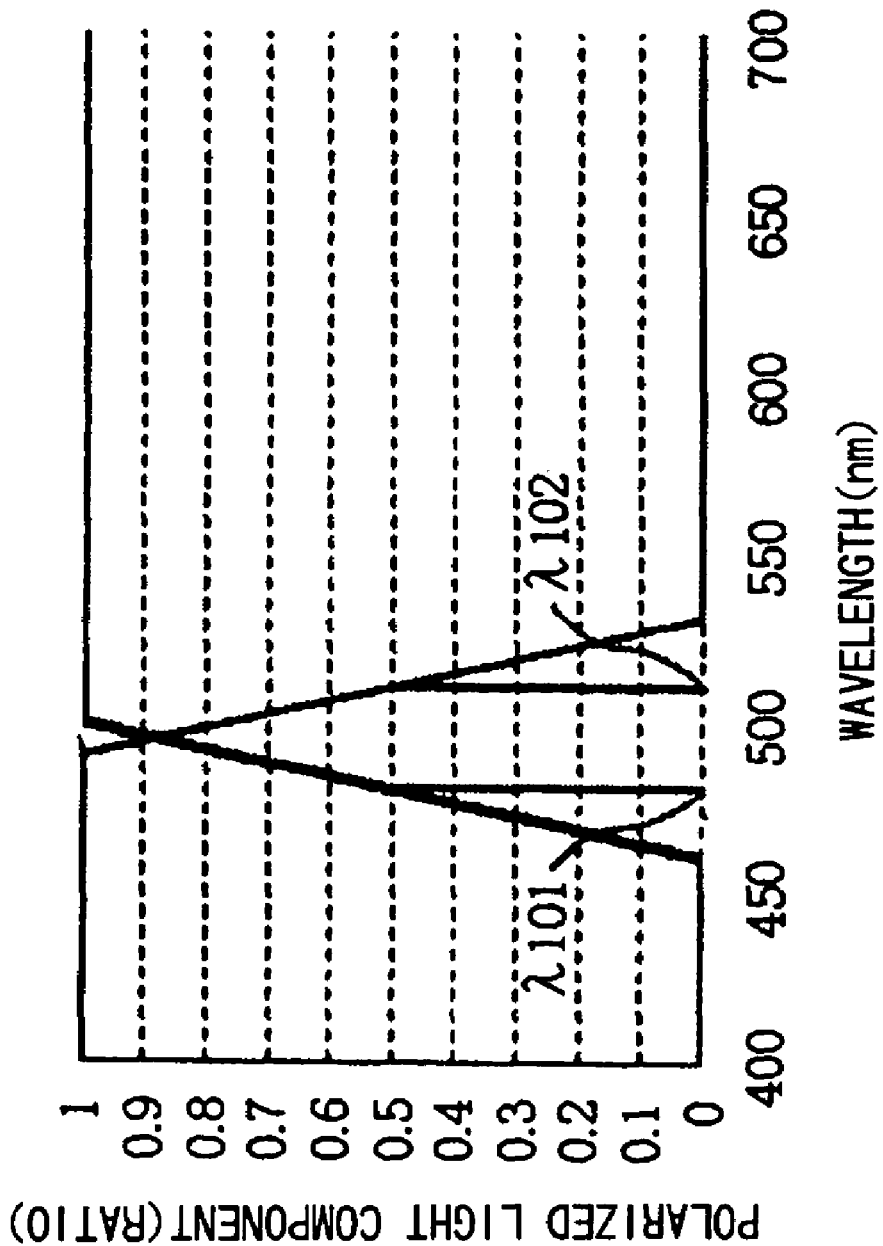
FIG. 26 is a view showing the characteristics of a color-selective wave plate according to Embodiment 10.

FIG. 25 shows the characteristics of the dichroic mirror 106 for a P-polarized light component in the present embodiment with thick lines, FIG. 26 shows the characteristics of the first color-selective wave plate 108a with thick lines, and shows those of the second color-selective wave plate 108b with thin lines.

In an optical path of R, the light component of R reflected by the dichroic mirror 106 is made incident into the first polarization beam splitter 10a as P-polarized light (|), transmitted through the polarization splitting surface 101a of the first polarization beam splitter 10a, and reaches the reflection type liquid crystal display element 11r for R. The light component of R is image-modulated and reflected by the reflection type liquid crystal display element 11r for R. The P-polarized light component (|) of the image-modulated reflection light component of R is transmitted through the polarization splitting surface 101a of the first polarization beam splitter 10a. Almost all the P-polarized light component of R is returned to the light source side and is eliminated from projection light. The S-polarized light component (•) of the image-modulated reflection light component of R is reflected by the polarization splitting surface 101a of the first polarization beam splitter 10a and is made into projection light. The S-polarized light component of R transmitted through the first polarization beam splitter 10a is made incident into the third polarization beam splitter 10c as S-polarized light (•), reflected by the polarization splitting surface 101c of the third polarization beam splitter 10c, and reaches the projection lens 13.

With respect to the light components of G and B transmitted through the dichroic mirror 106, a color light component in the wavelength region between B and G is reflected by the color filter 97. The light components of G and B whose colors have been thus adjusted are made incident into the first color-selective wave plate 108a. The first color-selective wave plate 108a has an action of rotating the polarization direction of the light component of G by 90 degrees, wherein the light component of B is made incident into the second polarization beam splitter 10b as P-polarized light (|), and the light component of G is made incident thereinto as S-polarized light (•)

The light component of B is image-modulated and reflected by the reflection type liquid crystal display element 11b for light B. The P-polarized light component (|) of the image-modulated reflection light component of B is transmitted again through the polarization splitting surface 101b of the second polarization beam splitter 10b. Almost all the P-polarized light component of B is returned to the light source side and is eliminated from projection light. The S-polarized light component (•) of the image-modulated reflection light component of B is reflected by the polarization splitting surface 101b of the second polarization beam splitter 10b and is made into projection light. Similarly, the light component of G is image-modulated and reflected by the reflection type liquid crystal display element 11g for G. The S-polarized light component (•) of the image-modulated reflection light component of G is reflected again by the polarization splitting surface 101b of the second polarization beam splitter 10b. Almost all the S-polarized light component of G is returned to the light source side and is eliminated from the projection light. The P-polarized light component (|) of the image-modulated reflection light component of G is transmitted through the polarization splitting surface 101b of the second polarization beam splitter 10b and is made into projection light, wherein the projection light components of B and G are combined to be a single light flux.

The combined projection light components of G and B are made incident into the second color-selective wave plate 108b. The second color-selective wave plate 108b rotates the polarization direction of the light component of B by 90 degrees, and the light components of G and B are made incident into the third polarization beam splitter 10c as P-polarized light (•), and are transmitted through the polarization splitting surface 101c of the third polarization beam splitter 10c, wherein the light components of G and B are combined with the projection light R.

Herein, where 50% wavelength λ101 of the first color-selective wave plate 108a is compared with 50% wavelength λ102 of the second color-selective wave plate 108b, these are set so as to satisfy:

$$\lambda 101 \ne \lambda 102$$

and $$\lambda 101 < \lambda 102.$$

Thereby, a light component in the wavelength region between the two wavelengths λ101 and λ102 is made incident into the second polarization beam splitter 10b as S-polarized light.

In Embodiments 1 to 10, the description was based on that the color splitting member is a dichroic mirror. However, a combination of a third color-selective wave plate and a fourth polarization beam splitter may be used as the color splitting member. In addition, although the third polarization beam splitter 10c is used in Embodiments 1 to 10, a dichroic prism may be used in stead of it.

Further, the position of the liquid crystal display element in the optical path (G in Embodiments 1 to 8 or R in Embodiments 9 and 10) of a single color light component split by the dichroic mirror with respect to the first polarization beam splitter 10a may not be necessarily the illustrated position. It may be disposed at a position symmetrical with respect to the polarization splitting surface when being observed from the position illustrated in the drawings.

In addition, in the characteristics of the color filter, the 50% wavelength can be converted in response to a color (or chromaticity) desired to be reproduced as long as the characteristics are in the range of conditional expressions of the present invention.

Further, in the embodiments, the polarization beam splitter has an action of a polarizer with respect to illumination light and an analyzer with respect to the projection light. Further, in order to improve the contrast, a polarizing element which can transmit light having a specified polarization direction may be provided at the incidence side and emergence side of the polarization beam splitters 10a and 10b.

Furthermore, the present invention can be applied to a color splitting/combining optical system having no color filter (ex. The color filter 7 in FIG. 1).

The structures of the respective embodiments and effects thereby brought about may be further described as follows.

1. The Embodiments are provided with: a white-color light source, three reflection type liquid crystal display elements, a projection optical system, a polarization converting element which aligns non-polarized light from the white-color light source to light with a predetermined polarization direction, a first color splitting member which splits a white color light into two color light components, a second color splitting member which further splits either one of color light components split by the first color splitting member into two color light components, a first color combining member which combines respective color light components split by the second color splitting member into a single color light, and a second color combining member which combines the color light components combined by the first color combining member with another color light component split by the first color splitting member.

The second color splitting member is composed of a first color-selective wave plate which converts the polarization direction of color light, whose polarization direction has been aligned, by 90 degrees in a specified wavelength region to convert it to color light with different polarization direction, and a polarization beam splitter.

Also, the first color combining member is composed of a polarization beam splitter and the second color-selective wave plate which converts the polarization directions of two color light components, whose polarization directions differ from each other, in a specified wavelength region by 90 degrees, and aligns the polarization directions.

And, the condition of $$\lambda 1 \neq \lambda 2$$

is satisfied where, in the first color-selective wave plate, a wavelength in which the ratio of a light component whose the polarization direction is converted by 90 degrees becomes 50% is λ1, and in the second color-selective wave plate, a wavelength in which the ratio of a light component whose the polarization direction is converted by 90 degrees becomes 50% is λ2.

Thereby, a light component in the wavelength region between the wavelengths λ1 and λ2, that is, the light component which is made incident into the polarization beam splitter can be made into a state where it includes more an S-polarized light component.

2. A color filter continuously having a first transmission band, a non-transmission band and a second transmission band provided with respect to light from a short-wavelength side to a long wavelength side is provided at the incidence side of the first color-selective wave plate. Where a wavelength in which the transmittance becomes 50% when transiting from the first transmission band to the non-transmission band is λc1, and a wavelength in which the transmittance becomes 50% when transiting from the non-transmission band to the second transmission band is λc2, and λ0 is λ0=(λ1+λ2)/2, a condition of $$\lambda c1 < \lambda 0 < \lambda c2$$

is satisfied.

Figure 27:
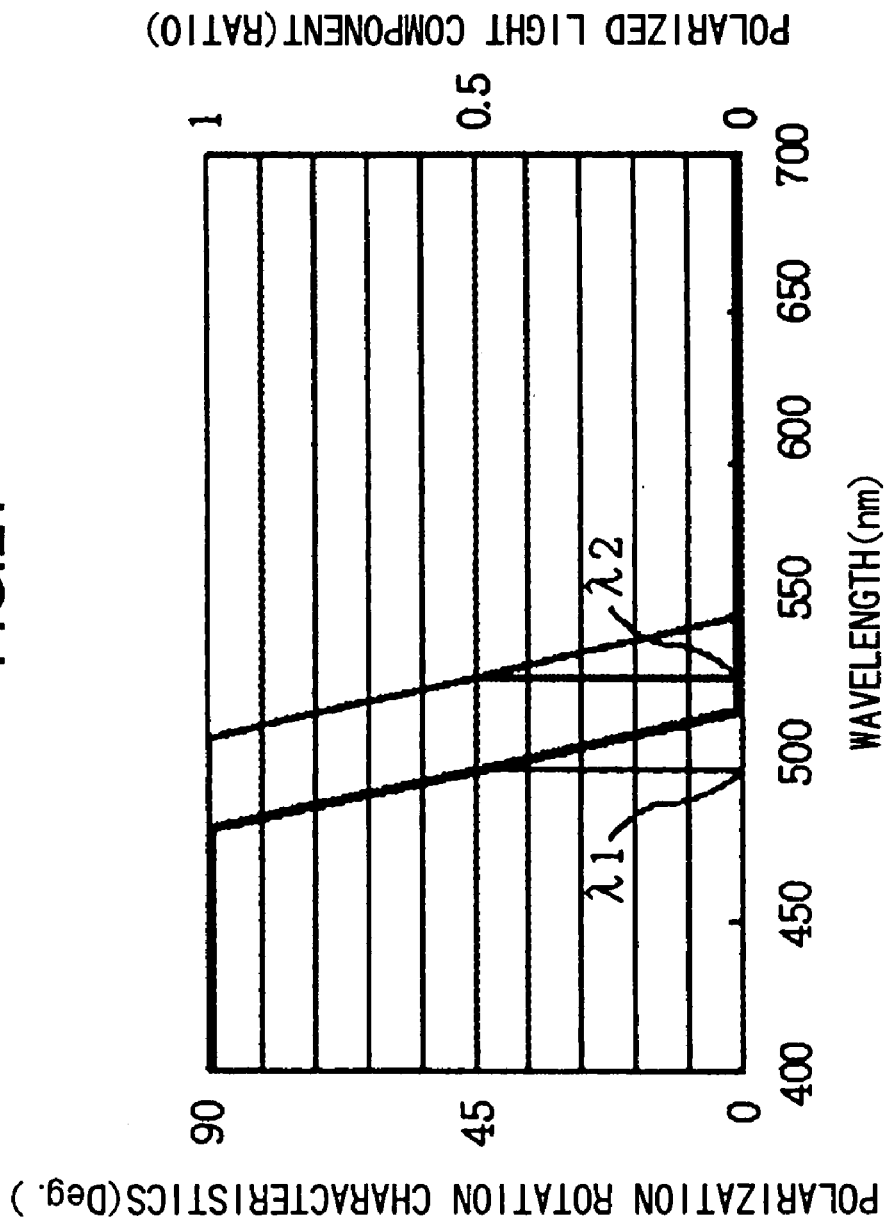
FIG. 27 is a view showing the characteristics of polarization rotation by a color-selective wave plate according to the present invention.
Figure 33:
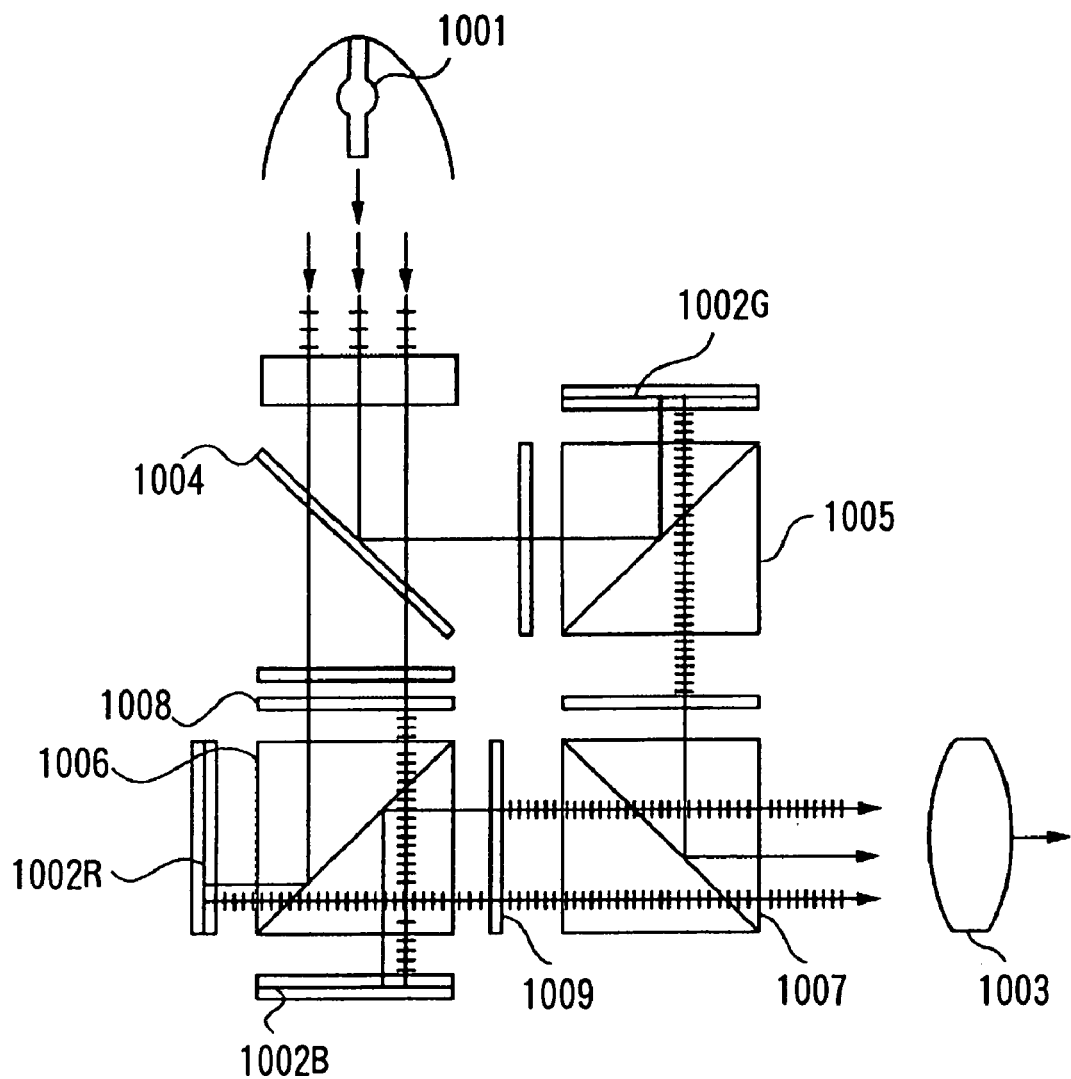
FIG. 33 is a view describing a conventional example.
Figure 34:
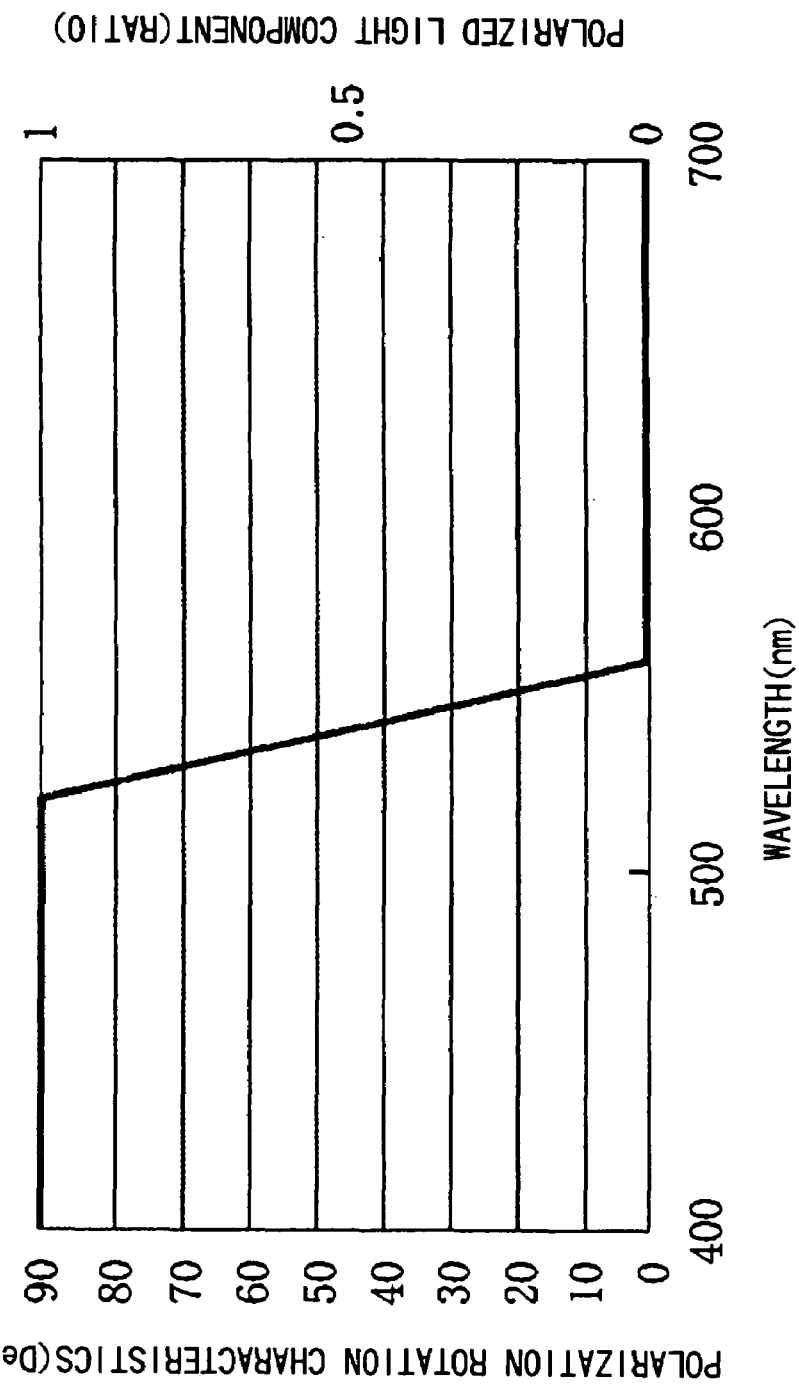
FIG. 34 is a view showing polarization rotation characteristics of the conventional example.
Figure 35:
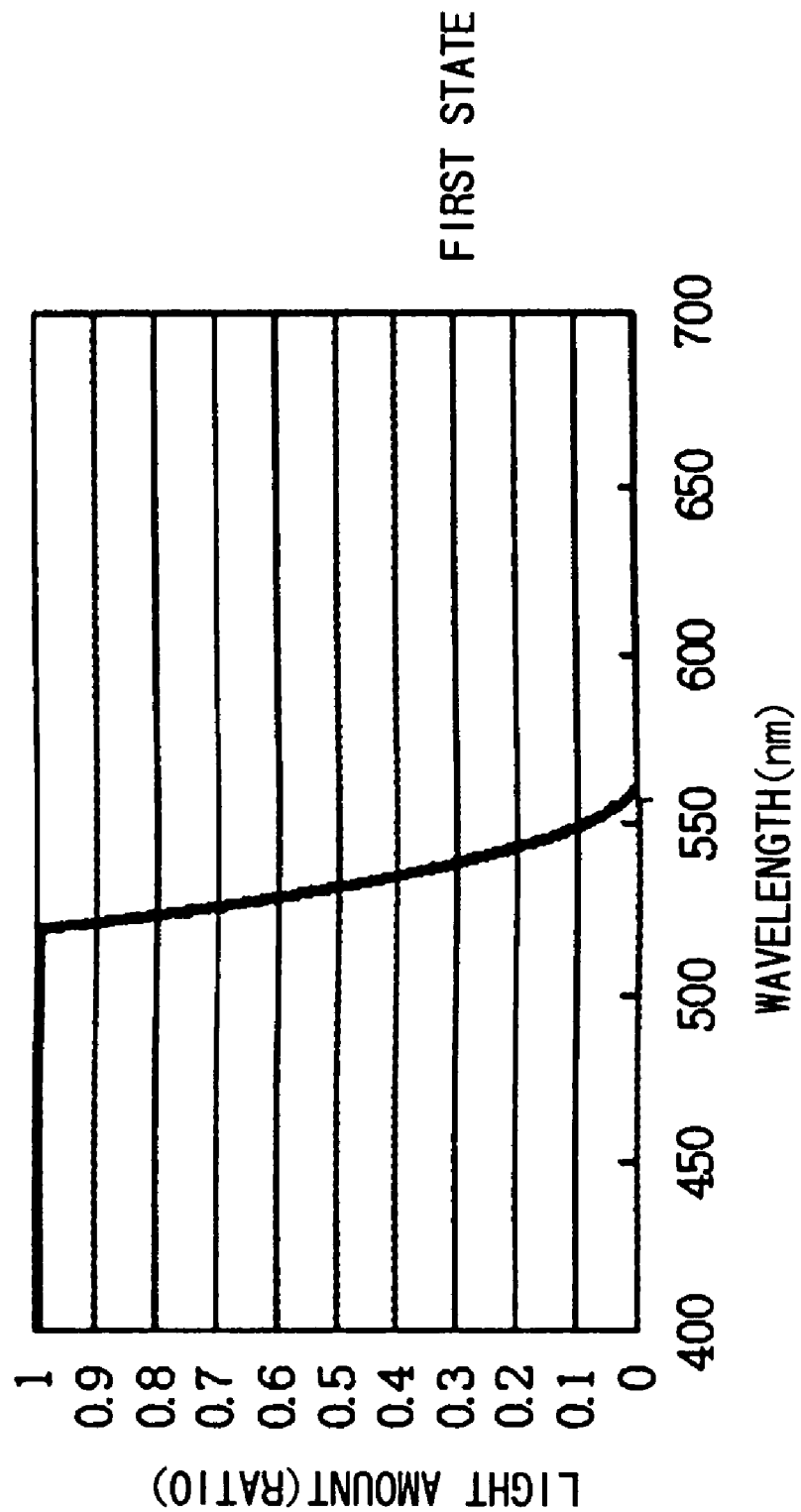
FIG. 35 is a view showing the ratio of light amount by a color-selective wave plate in the first state of the conventional example.
Figure 36:
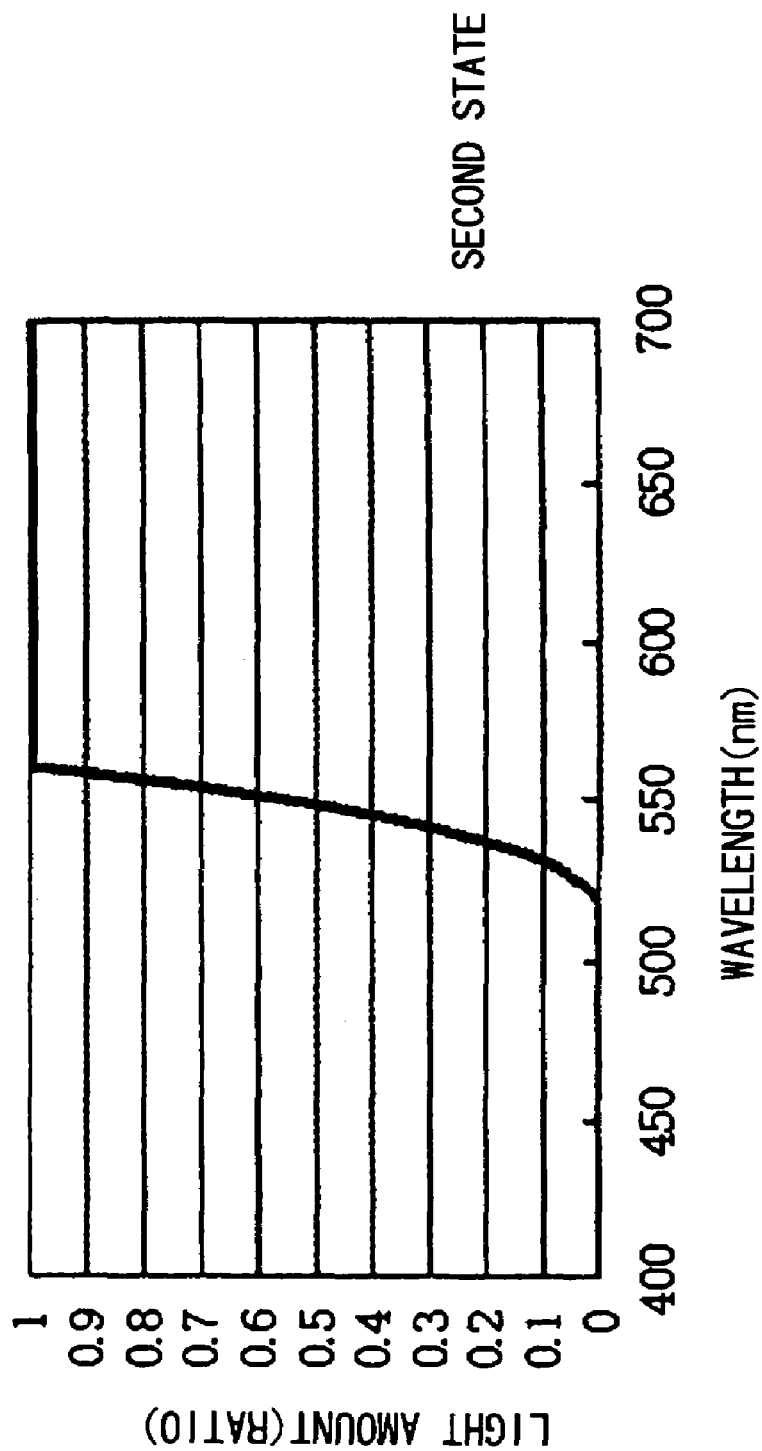
FIG. 36 is a view showing the ratio of light amount by a color-selective wave plate in the second state of the conventional example.

A detailed description is given of the structure and effects of the above-described point 1 with reference to the drawings. FIG. 27 shows the characteristics of rotating the polarization direction of the first and second color-selective wave plates with thick and thin lines. And, when the structure of the optical system is made the same as that of a conventional color splitting/combining optical system shown in FIG. 33, the first to the fourth states in which linear polarized light is converted by combinations of the color-selective wave plates will have the characteristics shown in FIG. 28 through FIG. 31.

Figure 28:
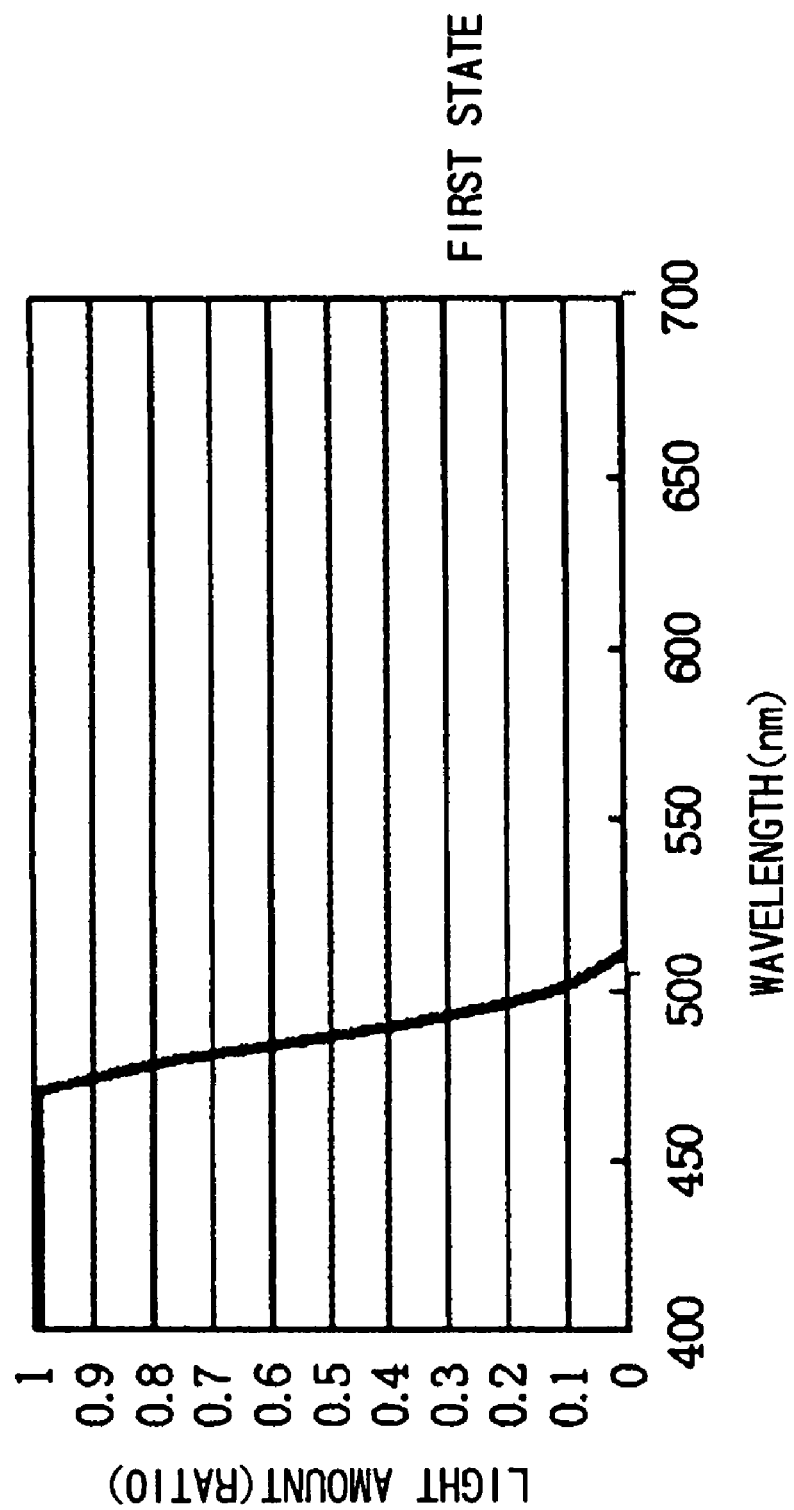
FIG. 28 is a view showing the ratio of light amount by a color-selective wave plate in the first state according to the present invention.
Figure 29:
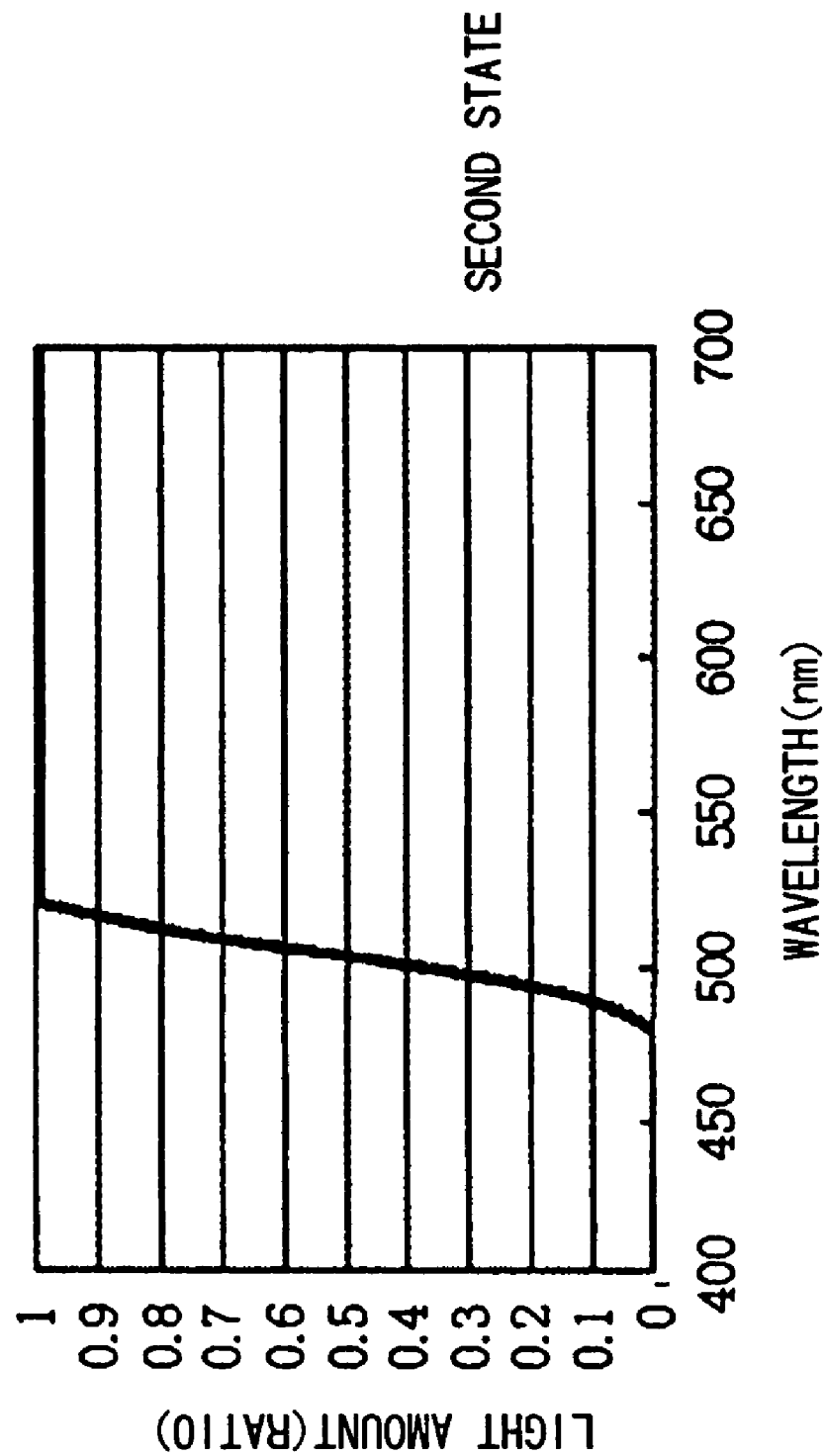
FIG. 29 is a view showing the ratio of light amount by a color-selective wave plate in the second state according to the present invention.
Figure 30:
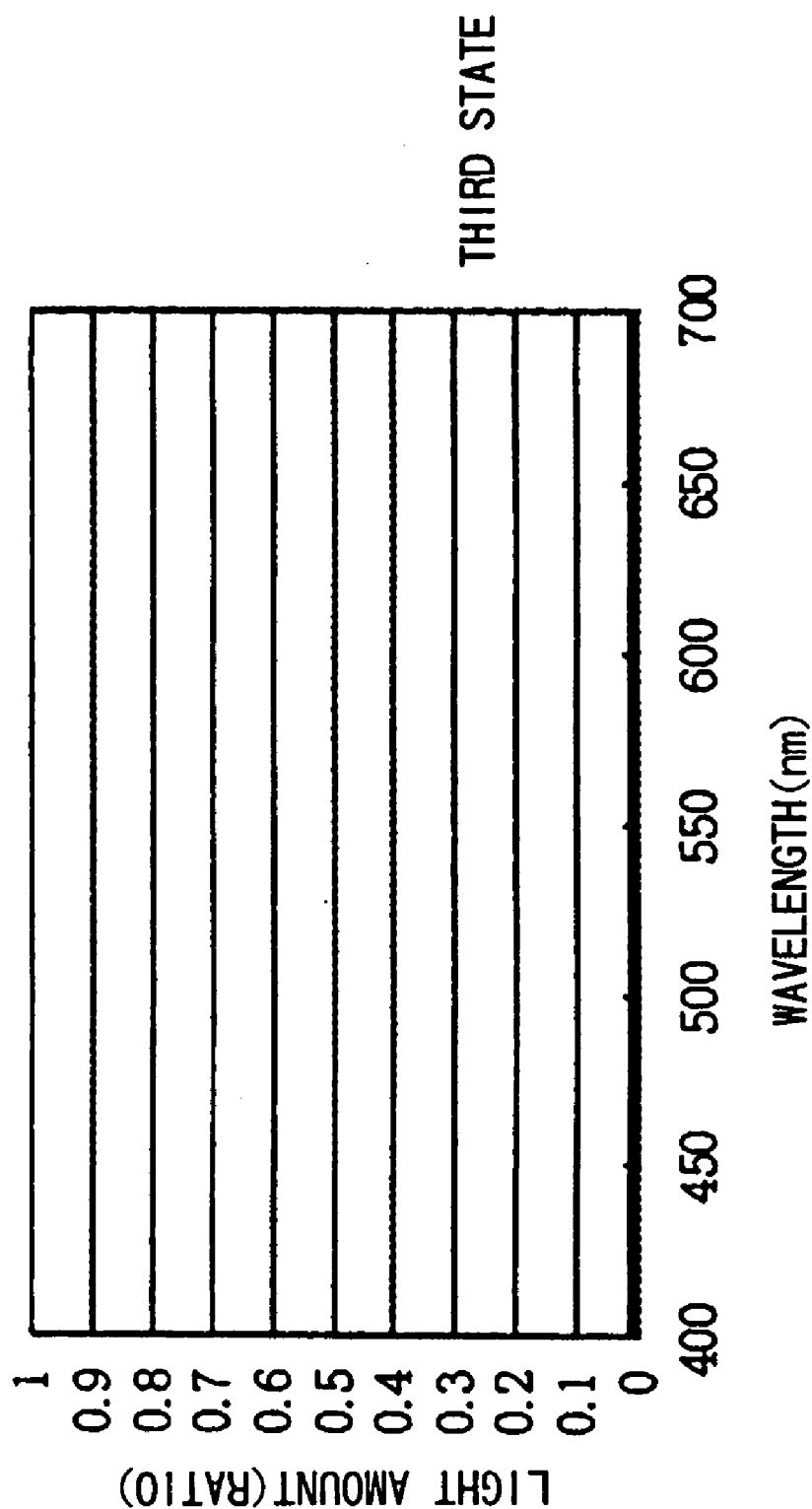
FIG. 30 is a view showing the ratio of light amount by a color-selective wave plate in the third state according to the present invention.
Figure 31:
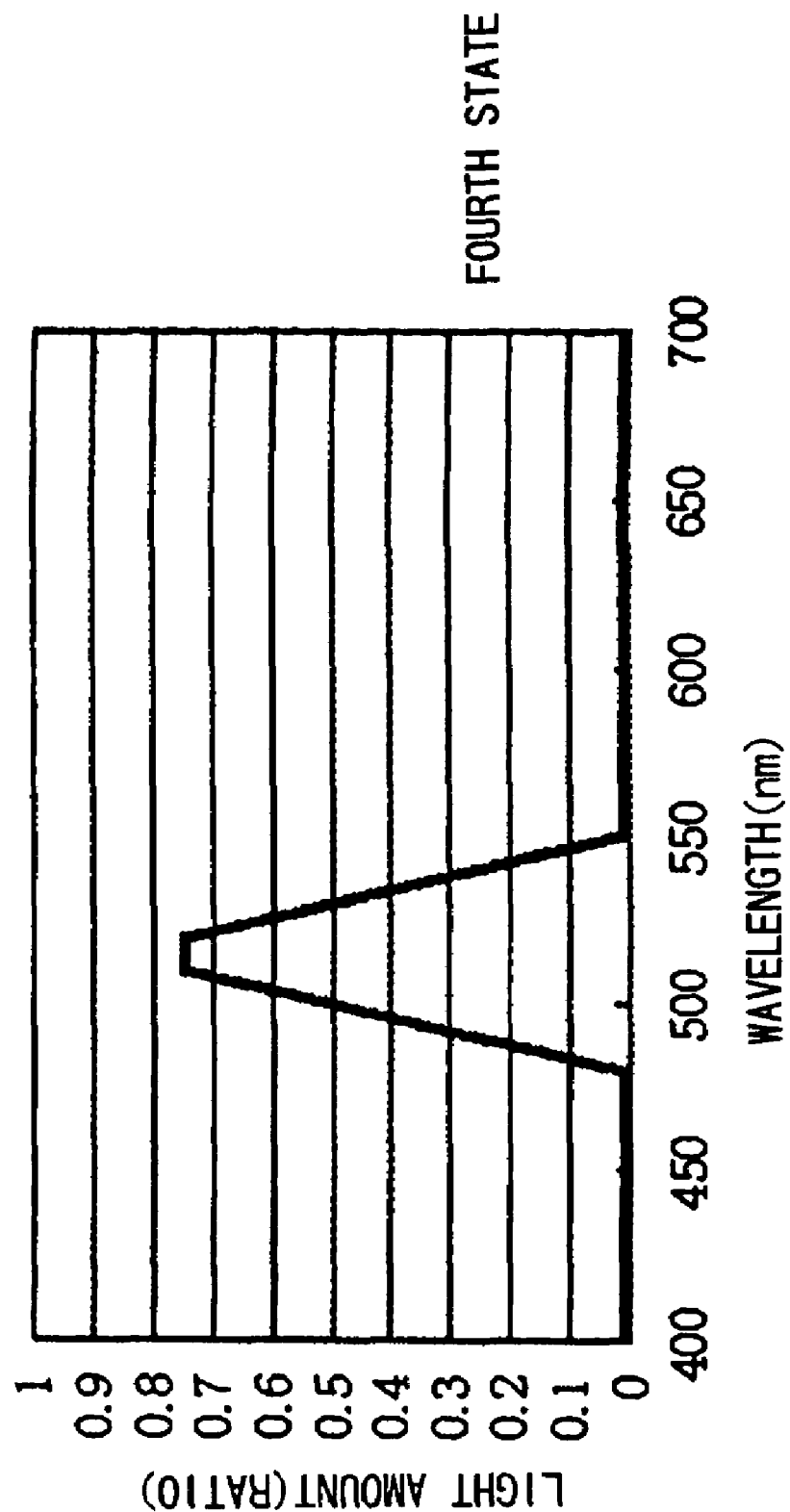
FIG. 31 is a view showing the ratio of light amount by a color-selective wave plate in the fourth state according to the present invention.

As in the conventional color splitting/combining optical system, and the first state shown in FIG. 28 corresponds to the light component of B, the second state shown in FIG. 29 corresponds to the light component of R. In the third state (See FIG. 30) and the fourth state (See FIG. 31), which show leakage light, no leakage light in the third state is provided.

At this time, if the polarization state of a light component having a wavelength between the wavelengths λ1 and λ2 which transmit the first color-selective wave plate at a transmittance of 50% is caused to have more of an S-polarized light component when the light component is made incident into the polarization beam splitter, the leakage light in the fourth state can be set so that it reflects and transmits (transmits and reflects) in the S-polarized light in the polarization beam splitter. Therefore, it becomes possible to suppress the leakage light in the fourth state to a low level.

Figure 32:
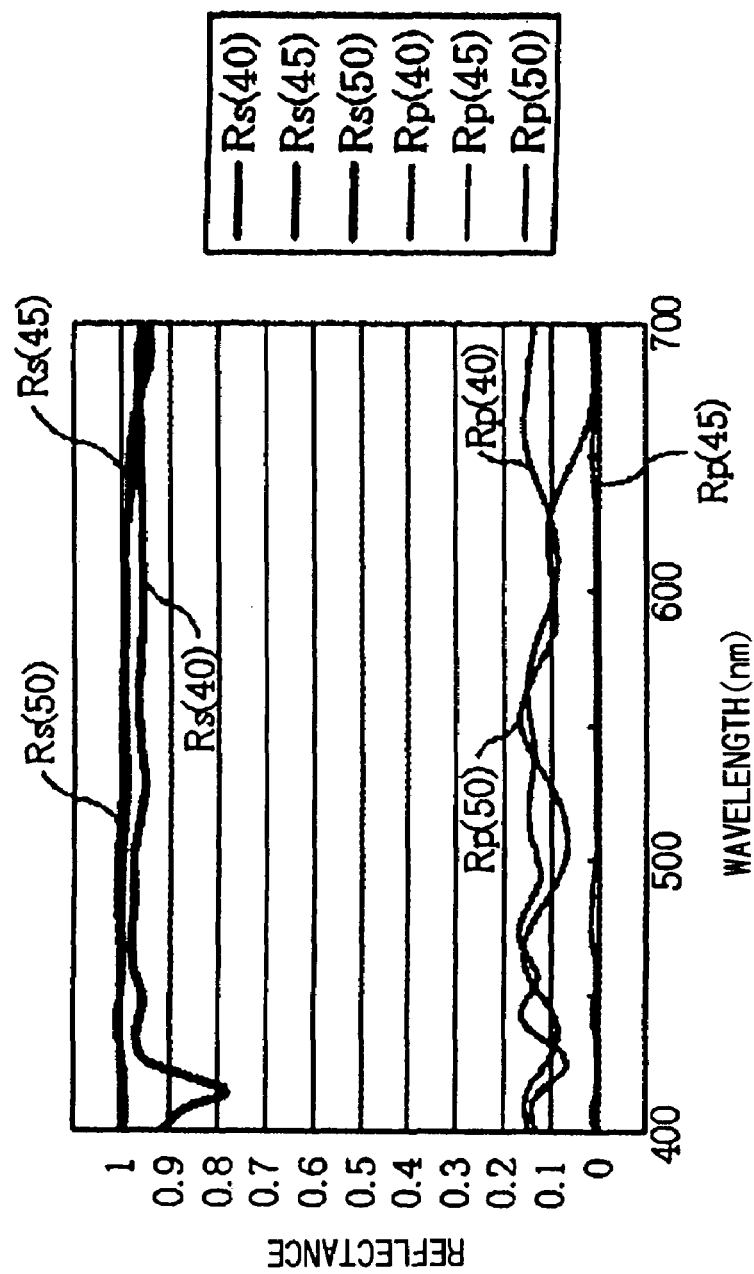
FIG. 32 is a view showing the reflection characteristics of a polarization splitting film of a polarization beam splitter.

This is based on the characteristics of the polarization beam splitter. FIG. 32 shows the reflection characteristics of a polarization splitting film of the polarization beam splitter. Numerals in brackets in the drawing are angles at which light is made incident into the polarization splitting film. Thus, in the polarization splitting film, the polarization splitting characteristics are lowered if the incident angle shifts from the reference angle 45 degrees). In particular, the characteristics with respect to the P-polarized light are lowered.

Thereby, the analyzing performance (reflectance of P-polarized light and transmittance of S-polarized light) of the polarization beam splitter is made higher when the S-polarized light is made incident. According to the research of the inventor, it was found that the analyzing performance of the S-polarized light is higher by five or more times than the analyzing performance of the P-polarized light. Therefore, since the leakage light is decreased in the polarization beam splitter when the fourth state is S-polarized light, the leakage light amount in the optical system can be suppressed to a large extent.

Further, a color filter continuously having the first transmission band, a non-transmission band and the second transmission band provided with respect to light from a short wavelength side to a long wavelength side is provided at the incidence side of the first color-selective wave plate. And, where a wavelength in which the transmittance becomes 50% when shifting from the first transmission band to the non-transmission band is λc1, and a wavelength in which the transmittance becomes 50% when shifting from the non-transmission band to the second transmission band is λc2, and λ0 is λ=(λ1+λ2)/2, the characteristics of the color filter are determined so that a condition of:

$$\lambda c1 < \lambda 0 < \lambda c2$$

can be obtained. Thereby, it becomes possible to suppress the leakage light in the fourth state to a further lower level.

As described above, according to the respective embodiments, in a color splitting/combining optical system in which the color-selective wave plate and polarization beam splitter are combined, light leakage when displayed in black can be remarkably decreased, wherein an image projection apparatus capable of obtaining a projection image of high contrast can be brought about.

Still further, in the respective embodiments, a description was given of the color splitting/combing optical system where reflection type image-forming elements are used. However, the present invention is applicable to a color combining optical system in which transmission type image-forming elements are used.

In detail, in the optical system shown in, for example, FIG. 1, of a light component of B and a light component of R which are made incident from a dichroic mirror 6 acting as a first color splitting member into the second polarization beam splitter 10b acting as a second color splitting member, the light component of B which transmitted through the polarization splitting surface (a first polarization splitting surface) of the second polarization beam splitter 10b and transmitted through a transmission type liquid crystal display element for B is guided, by a first mirror, to a fourth polarization beam splitter acting as a first color combining member (not shown).

Also, the light component of R which is reflected by the polarization splitting surface of the second polarization beam splitter 10b and is transmitted through the transmission type liquid crystal display element for R is guided to the fourth polarization beam splitter by a second mirror. The light component of B and the light component of R which are made incident into the fourth. polarization beam splitter are combined by the polarization splitting surface of the fourth polarization beam splitter. And, the combined light components of B and R are guided to the third polarization beam splitter 10c acting as a second color combining member via a third mirror.

On the other hand, a light component of G which transmitted through the dichroic mirror 6 and transmitted through a transmission type liquid crystal display element for G is guided to the third polarization beam splitter 10c by a mirror.

Thereby, light components of R, G and B combined by the third polarization beam splitter 10c are projected by the projection lens 13.

And, the first color-selective wave plate 8a may be disposed between the dichroic mirror 6 and the second polarization beam splitter 10b, a color filter may be disposed between the dichroic mirror 6 and the first color-selective wave plate 8a, and the second color-selective wave plate 8b may be disposed between the fourth polarization beam splitter and the third polarization beam splitter 10c, respectively.

While preferred embodiments have been described, it is to be understood that modification and variation of the present invention may be made without departing from scope of the following claims.

What is claimed is:

1. A color splitting/combining optical system comprising:
   a first optical member which splits light from a light source into a first color light component and a second color light component, the first optical member directing the first color light component to a first image-forming element;
   a second optical member which has a polarization splitting surface and splits the second color light component into a third color light component and a fourth color light component by using the polarization splitting surface, the second optical member directing the third color light component to a second image-forming element and directing the fourth color light component to a third image-forming element, and furthermore, the second optical member combining the third color light component from the second image-forming element with the fourth color light component from the third image-forming element by using the polarization splitting surface;
   a third optical member which combines the third and fourth color light components, which are combined by the second optical member, with the first color light component from the first image-forming element;
   a first color-selective wave plate disposed between the first optical member and the second optical member, which converts the polarization direction of a light component in a first wavelength region by 90 degrees; and
   a second color-selective wave plate disposed between the second optical member and the third optical member, which converts the polarization direction of a light component in a second wavelength region by 90 degrees,
   wherein the following condition is satisfied:

$$\lambda 1 \neq \lambda 2$$

where λ1 represents a wavelength in which the ratio of the light component having the polarization direction converted by 90 degrees by the first color-selective wave plate becomes substantially 50%, and λ2 represents a wavelength in which the ratio of the light component having the polarization direction converted by 90 degrees by the second color-selective wave plate becomes substantially 50%, and
   wherein 80% or more of a light component, in a wavelength region between the λ1 and the λ2, of light first incident on the polarization splitting surface is S-polarized light.

2. The color splitting/combining optical system according to claim 1, wherein substantially 95% or more of a light component, in a wavelength region between the λ1 and the λ2, of light incident on the polarization splitting surface is S-polarized light.

3. The color splitting/combining optical system according to claim 1, wherein a light component, in a wavelength region between the λ1 and the λ2, of light incident on the polarization splitting surface is substantially only S-polarized light.

4. The color splitting/combining optical system according to claim 1, further comprising:
   a color filter provided between the first optical member and the first color-selective wave plate, which substantially continuously has a first optical transmission band, an optical non-transmission band and a second optical transmission band from a short wavelength side to a long wavelength side, and satisfies the following condition:

$$\lambda c1 < \lambda 0 < \lambda c2$$

where λc1 represents a wavelength in which the transmittance in a fist transition region from the first optical transmission band to the optical non-transmission band becomes substantially 50%, $\lambda c2$ represents a wavelength in which the transmittance in a second transition region from the optical non-transmission band to the second optical transmission band becomes substantially 50%, and $\lambda 0$ represents $(\lambda 1+\lambda 2)/2$.

5. An image projection apparatus comprising:
a light source;
a first, a second and a third image-forming element;
a color splitting/combining optical system according to claim 1; and
a projection optical system which projects light combined by the color splitting/combining optical system.

6. The image projection apparatus according to claim 5, wherein the first, second and third image-forming elements are reflection type image-forming elements.

7. The image projection apparatus according to claim 5, wherein the first, second and third image-forming elements are reflection type liquid crystal elements.

8. The color splitting/combining optical system according to claim 1, wherein the following condition is satisfied:

$\lambda 1 < \lambda 2$.

9. A color splitting/combining optical system comprising:
a first color splitting member which splits light from a light source into a first color light component and a second color light component, the first color splitting member directing the first color light component to a first image-forming element;
a second color splitting member which has a first polarization splitting surface and splits the second color light component into a third color light component and a fourth color light component by using the first polarization splitting surface, the second color splitting member directing the third color light component to a second image-forming element and directing the fourth color light component to a third image-forming element;
a first color combining member which has a second polarization splitting surface and combines the third color light component from the second image-forming element with the fourth color light component from the third image-forming element by using the second polarization splitting surface;
a second color combining member which combines the third and fourth color light components, which are combined by the first color combining member, with the first color light component from the first image-forming element;
a first color-selective wave plate disposed between the first color splitting member and the second color splitting member, which converts the polarization direction of a light component in a first wavelength region by 90 degrees; and
a second color-selective wave plate disposed between the first color combining member and the second color combining member, which converts the polarization direction of a light component in a second wavelength region,
wherein the following condition is satisfied:

$\lambda 1 \neq \lambda 2$ where $\lambda 1$ represents a wavelength in which the ratio of the light component having the polarization direction converted by 90 degrees by the first color-selective wave plate becomes substantially 50%, and $\lambda 2$ represents a wavelength in which the ratio of the light component having the polarization direction converted by 90 degrees by the second color-selective wave plate becomes substantially 50%, and
wherein 80% or more of a light component, in a wavelength region between the $\lambda 1$ and the $\lambda 2$, of light first incident on the first polarization splitting surface is S-polarized light.

10. The color splitting/combining optical system according to claim 9, wherein the following condition is satisfied:

$\lambda 1 < \lambda 2$.

11. An image projection apparatus comprising:
a light source;
a first, a second and a third image-forming element;
a color splitting/combining optical system according to claim 9; and
a projection optical system which projects light combined by the color splitting/combining optical system.

* * * * *